US009449373B2

(12) United States Patent
Elliott et al.

(10) Patent No.: US 9,449,373 B2
(45) Date of Patent: Sep. 20, 2016

(54) MODIFYING APPEARANCE OF LINES ON A DISPLAY SYSTEM

(71) Applicant: SAMSUNG DISPLAY CO., LTD., Yongin, Gyeonggi-Do (KR)

(72) Inventors: Candice Hellen Brown Elliott, Santa Rosa, CA (US); Michael Francis Higgins, Duncans Mills, CA (US)

(73) Assignee: Samsung Display Co., Ltd. (KR)

( * ) Notice: Subject to any disclaimer, the term of this patent is extended or adjusted under 35 U.S.C. 154(b) by 148 days.

(21) Appl. No.: 14/183,262

(22) Filed: Feb. 18, 2014

(65) Prior Publication Data

US 2015/0237236 A1    Aug. 20, 2015

(51) Int. Cl.
G09G 5/02 (2006.01)
G09G 5/06 (2006.01)
G06T 3/40 (2006.01)
G06T 3/20 (2006.01)
G06T 5/00 (2006.01)
G06T 5/40 (2006.01)
G06T 11/60 (2006.01)
H04N 1/60 (2006.01)
H04N 5/57 (2006.01)
H04N 5/202 (2006.01)
H04N 9/68 (2006.01)
H04N 5/58 (2006.01)
G09G 3/20 (2006.01)

(52) U.S. Cl.
CPC ............ *G06T 5/003* (2013.01); *G09G 3/2003* (2013.01); *G09G 5/02* (2013.01); *G06T 2207/20192* (2013.01); *G09G 2300/0452* (2013.01); *G09G 2340/0457* (2013.01)

(58) Field of Classification Search
CPC combination set(s) only.
See application file for complete search history.

(56) References Cited

U.S. PATENT DOCUMENTS

| 6,081,252 A * | 6/2000 | Reddy ................... G09G 5/022 345/605 |
| 7,916,244 B2 * | 3/2011 | Hur .................. G02F 1/133707 349/106 |
| 2003/0085906 A1 * | 5/2003 | Elliott ...................... G09G 3/20 345/613 |
| 2007/0064020 A1 * | 3/2007 | Credelle .............. G09G 3/2003 345/694 |
| 2009/0058873 A1 * | 3/2009 | Brown Elliott ......... G06T 5/009 345/589 |
| 2010/0118045 A1 * | 5/2010 | Brown Elliott .... G02B 27/2214 345/589 |
| 2010/0149204 A1 * | 6/2010 | Han ........................ G09G 5/02 345/589 |

* cited by examiner

*Primary Examiner* — Wesner Sajous
(74) *Attorney, Agent, or Firm* — Innovation Counsel LLP

(57) ABSTRACT

A computer-implemented method of modifying image data is presented. The method entails detecting a triggering pattern based on colors and saturation values of a group of pixels, wherein at least one of the pixels includes a plurality of subpixels, and wherein the triggering pattern includes at least a portion of one of a diagonal line and a vertical line. The method changes the image data for a specific subpixel in the group of pixels, wherein the specific subpixel is located in or adjacent to the diagonal line or the vertical line. Alternatively, the method entails detecting a border between saturated-color subpixels and non-saturated-color subpixels, and adding luminance to white subpixels at the border. A display system configured to execute the above methods and a computer-readable medium storing instructions for executing the above methods are also presented.

22 Claims, 32 Drawing Sheets

110

MODIFYING APPEARANCE OF LINES ON A DISPLAY SYSTEM

FIELD OF INVENTION

This invention relates generally to a display system, and more particularly displaying saturated colors.

BACKGROUND

Traditionally, a display system generated color images using red, green, and blue subpixels that can be combined to create a range of colors. In the physical world, colors are formed by relatively bright white light falling onto pigmented objects that absorb some portion of the light and reflect the rest. Non-color-saturated objects that are, for example, white or pastel may reflect substantially all of the light, thus appearing visually brighter than saturated color objects. Conversely, objects that form saturated colors absorb most of the light and reflect only a narrow band of the full spectrum of light falling on it, making the saturated-colored objects appear less bright. Statistically, saturated colors are relatively rare in the physical world. Furthermore, when saturated colors occur in nature, they are quite dark; bright saturated colors are rare in the physical world.

In manufacturing display systems that show images of the physical world, there is a trade-off between the brightness of the non-saturated colors and the color saturation gamut of the filtered backlight display. The more saturated the color filters, the richer the colors will appear in the image but at the expense of reduced overall brightness. If the filters are made less saturated to increase brightness of the display, the images will be brighter but the colors will not be as vibrant.

One of the ways to address this situation is by adding a white subpixel to the traditional RGB system to form a red, green, blue, and white (RGBW) system. The white subpixels significantly increase the brightness of the display system with non-saturated colors to effectively improve the perceived quality of the displayed images, most of which are of the physical world. FIG. 1 shows an example of a subpixel layout including R, G, B, and W subpixels. In one possible configuration of FIG. 1, subpixels 104 with vertical stripes represent "red" subpixels, subpixels 106 with diagonal stripes represent "green" subpixels, subpixels 102 with horizontal stripes represent "blue" subpixels, and unshaded subpixels 108 represent "white" subpixels.

The incorporation of white subpixels, while helpful for displaying images of the physical world, is not so advantageous when it comes to displaying texts. Texts, unlike most objects in the physical world, often come in saturated colors. The white subpixels would be minimally used or even turned off to display text in saturated colors. Hence, saturated-color texts, especially small fonts with single-pixel-wide strokes, suffer from having fewer subpixels during RGBW reconstruction. Specifically, the presence of un-used white subpixels with saturated-color images may cause resolution loss in diagonal direction and making the horizontal and vertical lines look dotty. A technique for using RGBW subpixels in a way that is advantageous for displaying text is desired.

SUMMARY

In one aspect, the inventive concept pertains to a computer-implemented method of modifying image data. The method entails detecting a triggering pattern based on colors and saturation values of a group of pixels, wherein at least one of the pixels includes a plurality of subpixels, and wherein the triggering pattern includes at least a portion of one of a diagonal line and a vertical line. The image data is changed for a specific subpixel in the group is pixels, wherein the specific subpixel is located in or adjacent to the diagonal line or the vertical line.

In another aspect, the inventive concept pertains to a computer-implemented method of modifying image data, wherein the method entails detecting a border between saturated-color subpixels and non-saturated-color subpixels, and moving energy (e.g., in the form of luminance) to white subpixels at the border.

These techniques may be used, for example, to improve the clarity of saturated-color texts.

In yet another aspect, the inventive concept pertains to a display device that includes a display panel having pixels that include subpixels of different colors, and a processor that is configured to receive image data, detect a triggering pattern based on colors and saturation values of a predetermined group of pixels, determine the presence of image data that would display at least one of a diagonal line and a vertical line, and change the image data for a specific subpixel in the group of pixels, wherein the specific subpixel is located in or adjacent to the diagonal line or the vertical line.

In yet another aspect, the inventive concept pertains to a display device that includes a display panel having pixels, the pixels including subpixels of different colors, and a processor that is configured to: detect a border between saturated-color subpixels and non-saturated-color subpixels, and move energy to white subpixels at the border.

The inventive concept may further pertain to a computer-readable medium storing instructions for executing one or more of the above methods.

DETAILED DESCRIPTION

Efforts to address the above-described problems with displaying saturated-color texts using RGBW displays include implementations of adaptive filtering. Adaptive filtering techniques can be used to maximize image sharpness in lieu of Metamer Sharpening (which is also sometimes called Meta Luma Sharpening). The adaptive filters disclosed herein generally look for a triggering pattern, such as a vertical line, a diagonal line, and isolated dots in 3×3 patterns around each subpixel that is processed. These triggering patterns may be recognized in a threshold version (R, G, B data) of the input image, which is in the data format before the image is translated into RGBW format. Patterns of single bits and the inverse of each pattern may also be tested to find black lines on a yellow background as well as yellow lines on a black background.

In addition to relying on a thresholded version of the R, G, and B data of the input image, the saturation level of every subpixel is also calculated to allow a thresholding of the saturation level to a single bit. The saturation bit may be used in a number of ways. The saturation bit indicates which subpixels are saturated, and helps detect any other subpixel that is orthogonally near (i.e., on, above, below, left, or right of) a saturated subpixel. Identifying the location of saturated subpixels in this manner helps detect the presence of a triggering pattern.

With the basic adaptive filtering technique, the adaptive filter may be applied just to an area near saturated subpixels. Sometimes, a self-sharpening filter may be applied near saturated subpixels to help sharpen up the edges of colored text. Optionally, a meta-luma-sharpening (MLS) filter may be applied to black and white text (white being unsaturated).

Figure 1:
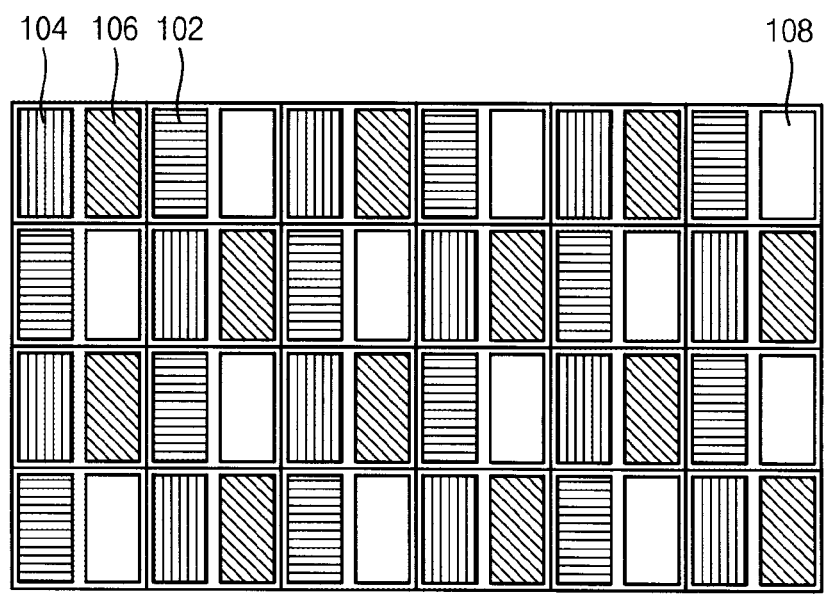
FIG. 1 depicts an example of a subpixel layout including R, G, B, and W subpixels.

Most of the disclosure will be provided in the context where the RGBW subpixels of FIG. 1 are shown grouped into RGB logical pixels and W logical pixels. However, this is not a limitation of the inventive concept and other "logical pixels" are possible. For example, the colored subpixels may be arranged as RG logical pixels and BW logical pixels, for example for hardware design efficiency. A "3×3 subpixel area," as used herein, means an area that has three logical pixels across and three logical pixels down.

Figure 2A:
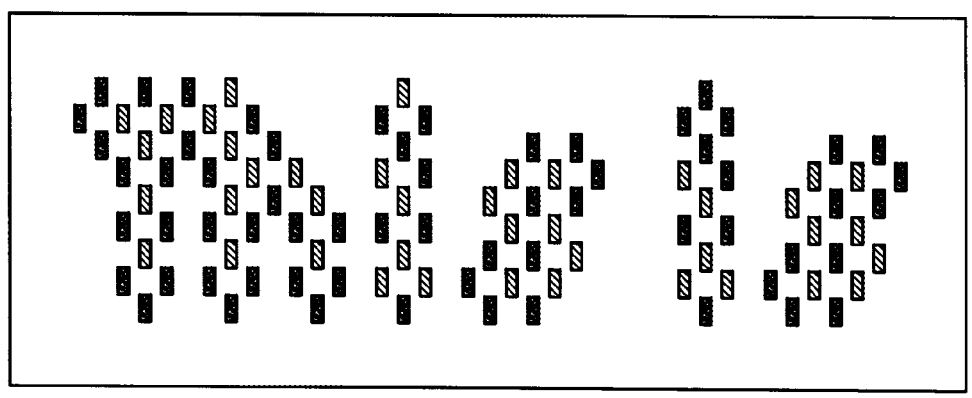
FIG. 2A and FIG. 2B depict how the word "This is" would be displayed before and after adaptive filtering, respectively.
Figure 2B:
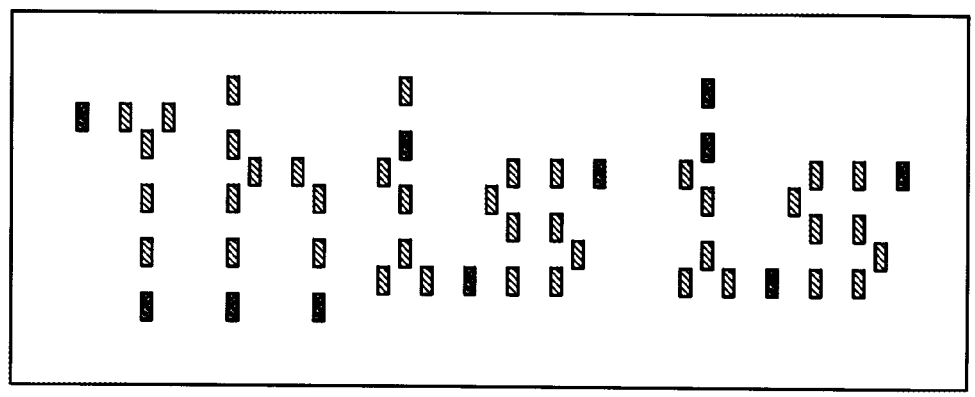

FIG. 2A, FIG. 2B, FIG. 3A, and FIG. 3B illustrate the effect of basic adaptive filtering techniques. FIG. 2A and FIG. 2B show the word "This" on a display panel before and after adaptive filtering, respectively. FIG. 2A depicts what the image looks like when the R, G, and B data of the input image are converted to RGBW data and shown on an RGBW display panel having a subpixel array such as what is shown in FIG. 1. A comparison of FIG. 2A with FIG. 2B shows that in this particular case, adaptive filtering darkens or turns off some of the subpixels that are in prescribed positions relative to the saturated subpixels. This selective darkening or turning off of subpixels in prescribed positions makes the text clearer and easier to read for the viewer. In some cases, subpixels that are in certain positions with respect to the saturated subpixels may be brightened, as opposed to darkened. However, brightening may not be possible if the saturated text are already at maximum brightness.

Figure 3A:
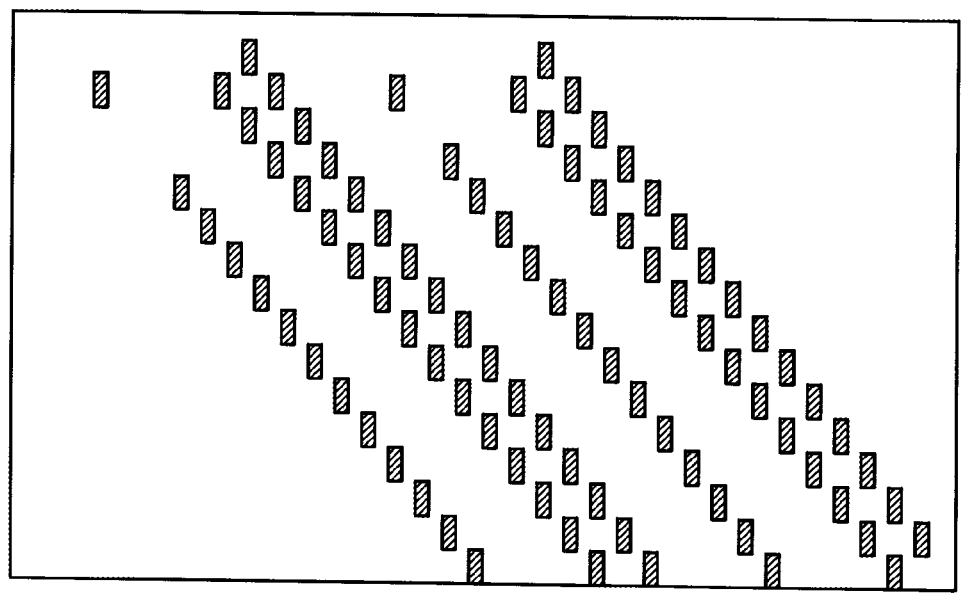
FIG. 3A and FIG. 3B depict how saturated diagonal lines would be displayed before and after adaptive filtering, respectively.
Figure 3B:
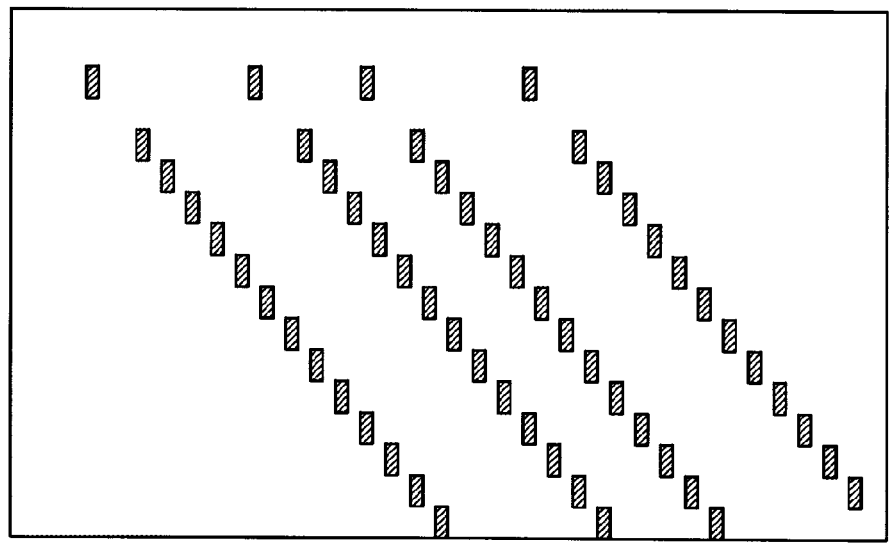

FIG. 3A and FIG. 3B illustrate another example of the effects of basic adaptive filtering. Unlike in the case of FIG. 2A and FIG. 2B, where subpixels are selectively darkened or turned off, this basic filtering technique selectively moves input pixels (usually RGB pixels) to make the text appear clearer. Without the basic filtering, some diagonal lines may be rendered doubled, appearing as fuzzy lines. FIG. 3A depicts the text image before the filtering. As shown, the image depicted in FIG. 3A shows six diagonal lines including two single diagonal lines and two double diagonal lines arranged in an alternating manner. After the filtering, the lines are moved sideways by a half pixel so that they land where they are rendered as sharper lines. The six lines in FIG. 3A may appear to be "consolidated" into four single lines to a viewer, as in FIG. 3B. The adaptive filtering process looks at the saturated subpixels and their neighboring subpixels to identify a triggering pattern, and makes a "judgment" as to what the intended text for display is. The area sample filter and the sharp filter are calculated several different ways, and the results of the pattern test and saturation tests are used to decide which results to use and combine to make the final value. This "judgment" and "adjustment" processes may be changed and expanded to look for more triggering patterns, for example horizontal and vertical lines as well as diagonal lines. When new triggering patterns are detected, more different kinds of sampling filters can be used. More logic can be added to test the results of new triggering patterns and select between sampling results.

As used herein, a "pixel" includes one or more subpixels, and each subpixel is associated with a color or is white (colorless). In this disclosure, input image data is assumed to be formatted for a "pixel," such that subpixel rendering process is used to translate the input data (which is usually RGB) to appropriate energy levels for the individual subpixels. An example of a subpixel rendering process for RGBW layouts may be found, for example, in U.S. Pat. No. 8,081,835.

In one aspect, the inventive concept includes calculating the saturation of an input pixel and using the result to decide how to change the individual subpixel values. The inventive concept also entails looking for a triggering pattern in thresholded values taken from the input pixels which have separate color components but are not mapped directly to subpixels in an RGBW display.

In one aspect, the inventive concept includes a method of rendering the vertical strokes of text of complementary colors: yellow, cyan, and magenta.

In another aspect, the inventive concept includes a method of rendering text and lines of all saturated colors using the W subpixels to "fill in" the missing reconstruction points.

Some new processes for enhancing text readability will now be presented: Complementary Color Test, White Fill Test, and Colored Diagonal Tests.

Complementary Color Test (COMTEST)

An enhanced adaptive filtering technique includes a new detector function that detects vertical lines and parts of vertical lines by examining a predefined area. The predefined area may be a 5×3 pixel area (which is an area defined as 5 input pixels across and 3 lines down) in one embodiment. The saturation levels of the 5×3 area is examined 9 times to detect possible combinations of vertical lines starting in or passing near the center pixel. This examination looks at single bits indicating whether or not the pixel is above or below a threshold in R, G, or B. For example, if the red threshold level is high for three pixels arranged in a vertical configuration, that indicates the presence of a vertical line in red. If the same pattern is seen in green but not in blue, that indicates the presence of a yellow saturated vertical line.

In one variation, the test may be done with three overlapping 3×3 tests in the same 5×3 test area instead of a single 5×3 test. Each 3×3 area involves three tests to detect the possible combinations of vertical lines starting in or passing near the center pixel. Using overlapping 3×3 tests entails the same number of tests and has the advantage of detecting multiple vertical lines close to each other.

The presence of a complementary color (cyan, magenta, or yellow) on the center subpixel could be detected with the existing threshold bits used in the basic adaptive filtering technique. Another implementation would be to use the separate triggering patterns to detect complementary colors. For example, if a vertical line is found in red and green but not in blue, the presence of a yellow line is inferred at this location and no farther test for yellow is performed.

Figure 4:
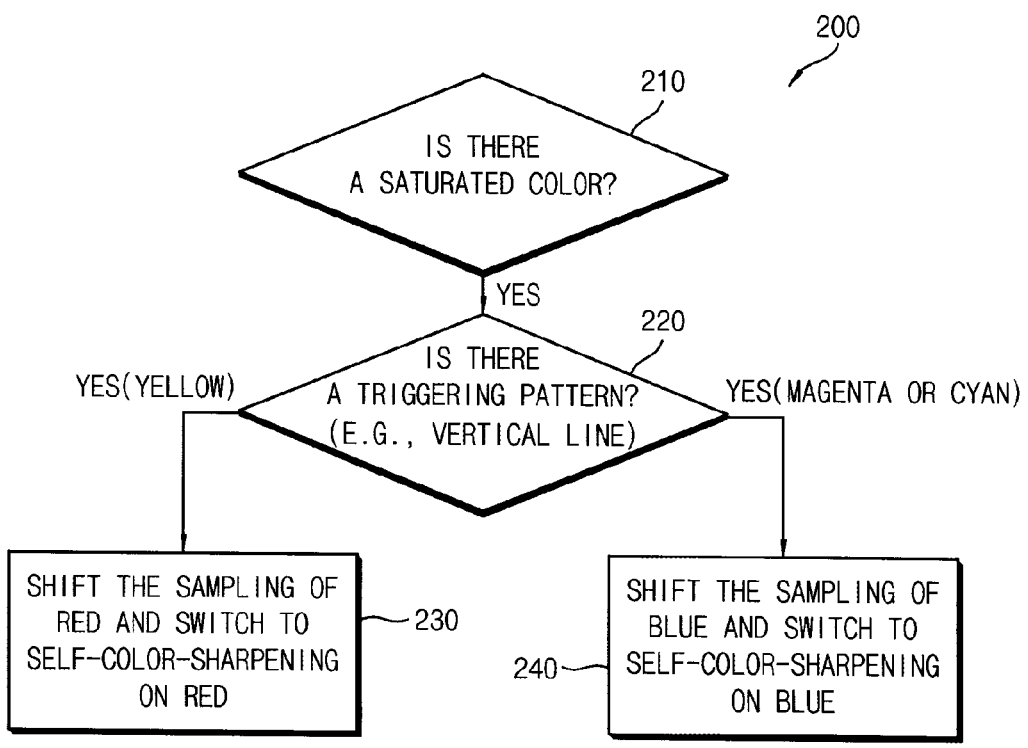
FIG. 4 depicts a flowchart summarizing the Complementary Color process in accordance with an enhanced adaptive filtering technique.

When a yellow line is detected through or near the center subpixel, the sampling of the red or blue subpixel is shifted (e.g., left by one input subpixel) depending on which test pattern was detected. FIG. 4 depicts a flowchart summarizing the Complementary Color process 200 in accordance with an enhanced adaptive filtering technique. As shown, the complementary color test process 200 starts with detection of a saturated color 210, for example in the threshold RGB data. When a saturated color is detected (step 210), the process checks, for example in a 3×3 pattern, to see if there is a triggering pattern (step 220). The triggering pattern, as mentioned above, may be a vertical line or a diagonal line in a complementary color (e.g., cyan, magenta, or yellow). The presence of a vertical line or a diagonal line is detected by selecting a center subpixel and looking at the surrounding subpixels in a 5×3 pattern or 3×3 pattern. If the saturated color of the triggering pattern is yellow, the sampling of the red sub-pixel is shifted left one input pixel (step 230). In other words, the color red disappears in one location and appears in another location. This shift has the effect of moving the red sub-pixels from the same line as the green sub-pixels to the lines above and below the green sub-pixels. The red sub-pixels are staggered or offset slightly to the right, making the resulting yellow line look less dotty. A self-sharpening filter may be used.

If, in step 220, it is determined that the saturated color is cyan or magenta and a cyan or magenta line is detected through or near the center pixel, the blue sub-pixels may be sampled shifted right one input pixel (step 240). This shifting reduces the dottiness in the resulting image. Self-sharpening may be used in this case.

Figure 5A:
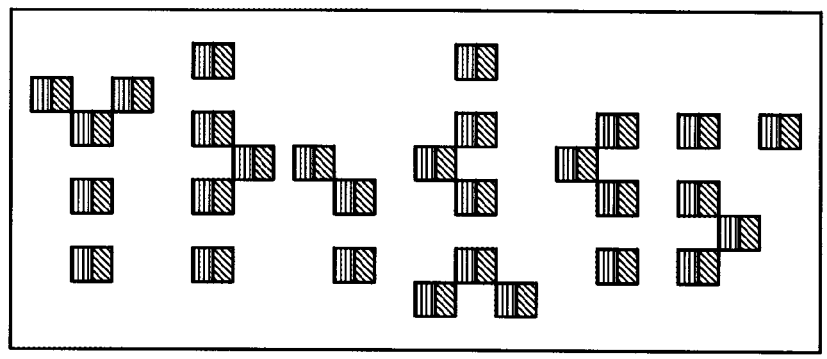
FIG. 5A and FIG. 5B illustrate the effect of the Complementary Color test process on a yellow pattern.
Figure 5B:
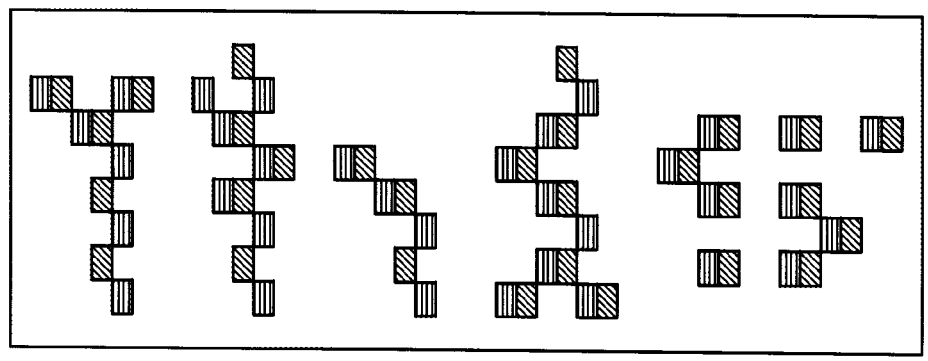

FIG. 5A and FIG. 5B illustrate the effect of the Complementary Color test process 200 on a yellow pattern. In these figures, the color red is represented with vertical-line shading, the color green is represented with diagonal-line shading, and the color blue is represented with horizontal-line shading. As explained above in reference to the flowchart of FIG. 4, the process has the result of moving the red sub-pixels on the whole from the same line as the green subpixels to the lines above and below. As shown in FIG. 5B, the red sub-pixels are staggered slightly to the right, and the resulting yellow line looks less dotty because the spaces are filled in by red sub-pixels.

Figure 6A:
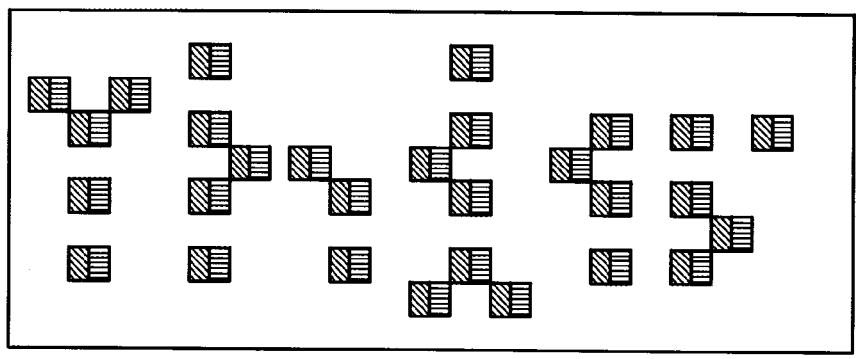
FIG. 6A and FIG. 6B illustrate the effect of the Complementary Color process on a cyan pattern.
Figure 6B:
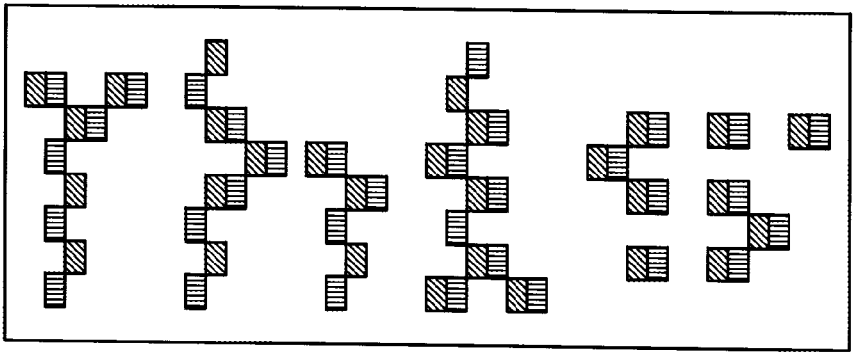

FIG. 6A and FIG. 6B illustrate the effect of the Complementary Color process 200 on a cyan pattern. When a cyan line is detected through or near the center subpixel and the center subpixel is cyan, the blue sub-pixels can be sampled shifted right by one input subpixel. This shift has the result of moving the cyan sub-pixels to the left and in the "empty" rows between the originally-activated sub-pixels, to decrease the dottiness of the resulting image.

Figure 7A:
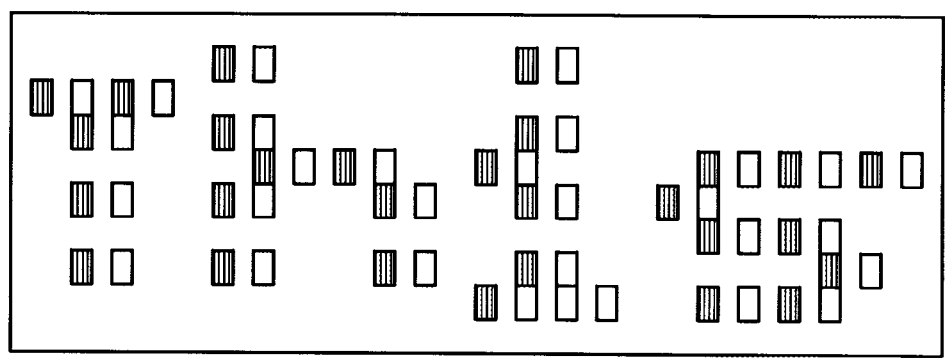
FIG. 7A and FIG. 7B illustrate the effect of the Complementary Color process on a magenta pattern.
Figure 7B:
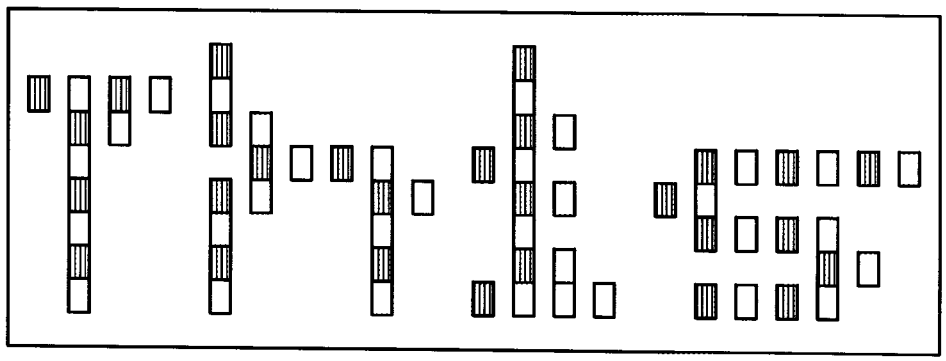

FIG. 7A and FIG. 7B illustrate the effect of the Complementary Color process 200 on a magenta pattern. As shown, when a magenta line is detected, the blue sub-pixels are sampled shifted right by one input subpixel. The result of the shift is that the blue subpixels are moved to the left and into the "empty" rows between the magenta subpixels. The empty spaces are filled in to decrease the dottiness of the image.

White Fill Tests

This technique fills in dottiness of saturated-color text with white sub-pixels. The boundary between a saturated color (e.g., green) and a non-saturated area (e.g., black) is detected. In areas where diagonal lines are detected, the white-fill feature is disabled. Known adaptive filtering techniques may be re-used to detect diagonal lines. Unlike the Complementary Color process 200, the White Fill process may be applied to complementary and non-complementary colors.

Figure 8:
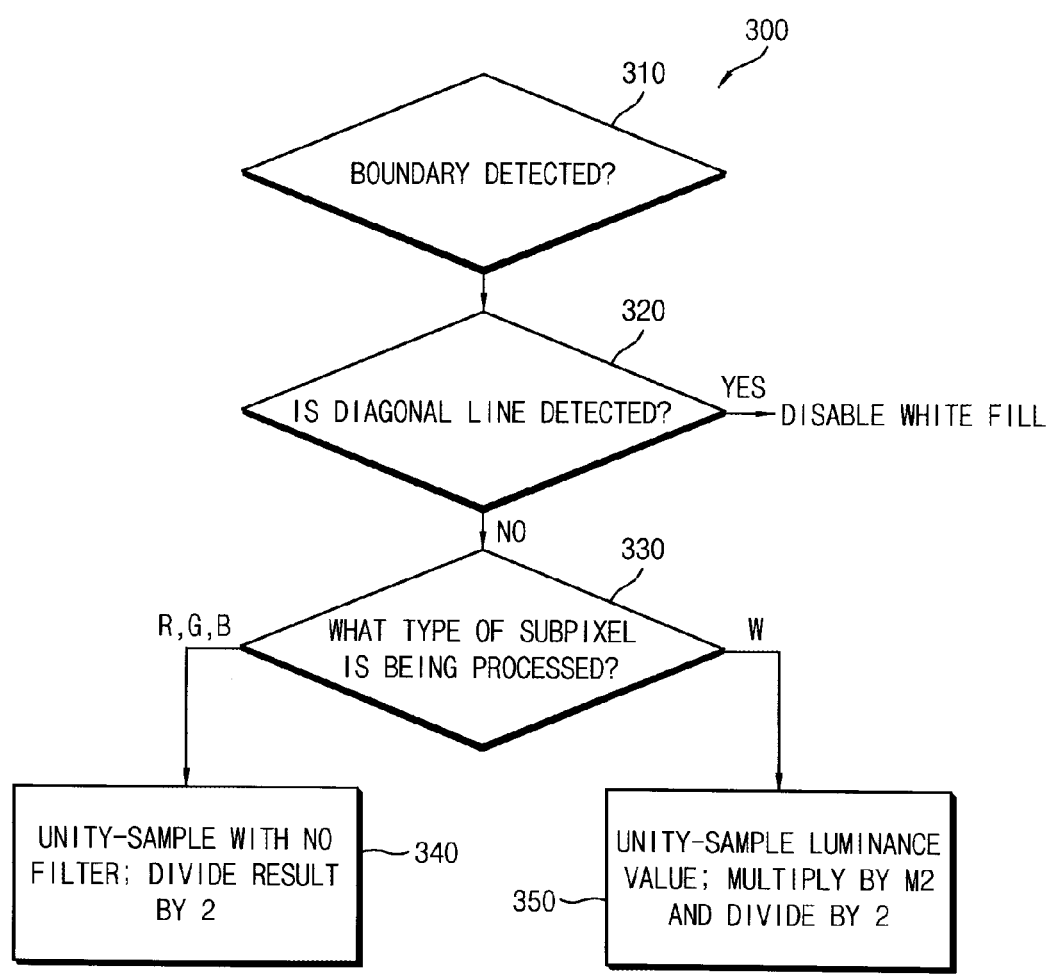
FIG. 8 is a flowchart depicting a White Fill process in accordance with the enhanced adaptive filtering technique.

FIG. 8 is a flowchart depicting a White Fill process 300 in accordance with the enhanced adaptive filtering technique. The White Fill process 300 begins with boundary detection (step 310) to identify vertical lines and/or horizontal lines. To detect the boundary between saturated and non-saturated areas, a center pixel is identified and the threshold bits of the four pixels that orthogonally neighbor the center pixel are counted. If this number is 0 or 4, then the center subpixel is considered to be completely outside or inside a saturated area and white fill is not performed. On the other hand, if the number is 1, 2, or 3, that indicates that the center subpixel is on the edge of a saturated area and white fill is used to fill in the dottiness of single-pixel colored lines and to fill in around the edges of black lines on a colored background. Even large fonts and large colored areas have their edges enhanced to improve readability for the viewer.

The White Fill process 300 is not optimal for improving the appearance of diagonal lines. Hence, if a diagonal line is detected in step 310, the White Fill process is disabled (step 320). If a saturated edge is detected (step 320) and the center pixel lands on an RGB logical pixel (step 330), the color is unity-sampled with no filter but the result is divided by two (step 340). If the saturated input pixel lands on a W logical pixel (step 330), the luminance channel is unity-sampled, multiplied by M2, and divided by 2 (step 350). M2 is the ratio of the brightness of the W sub-pixels against the brightness of RGB together (If M2=1, that means RGB has the same brightness as W). Sharpening may be disabled in step 340 and step 350.

During the division of luminance value, the luminance value that is divided is of the center input pixel.

Storing half of the sampled value in the colored sub-pixels and half in the W sub-pixels effectively uses the W sub-pixel as another sample point for the color. The W lands about half-way between colored sub-pixels and fills in the dottiness. In other words, a saturated-color subpixel (e.g., a green subpixel) turns itself half-off and a W subpixel turns itself half on. Using half of the energy for W with half of the colored value results in the two values having the same energy of just the colored sub-pixels alone. Dividing W by M2 corrects for differences between the brightness of the colors and W. Using W as a sample point for green (for example) decreases the saturation of green but enhances readability of the text.

Figure 9A:
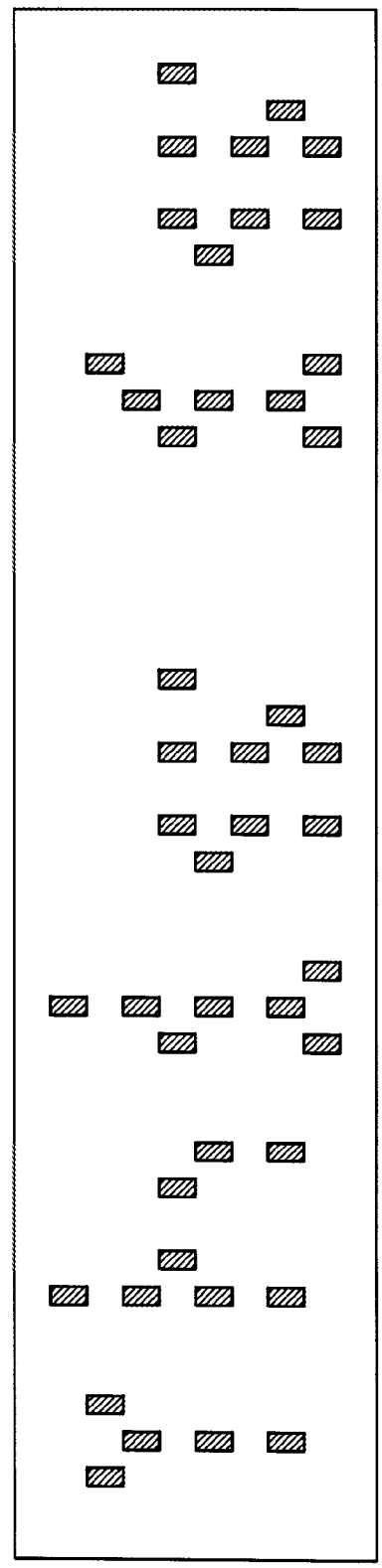
FIG. 9A and FIG. 9B illustrate the text "This is" before and after the White Fill process, respectively, where saturated-color text is displayed on a black background.
Figure 9B:
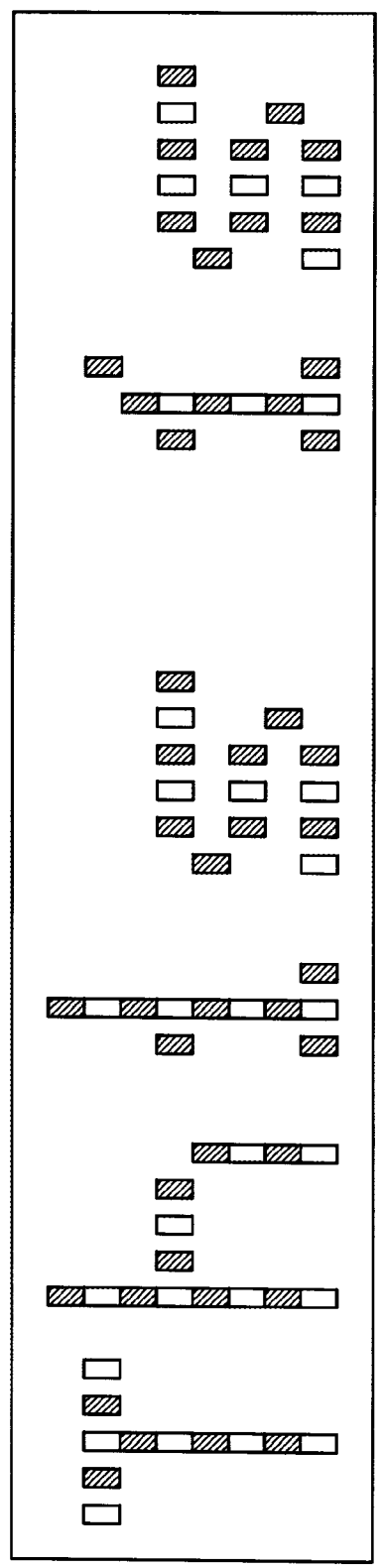

FIG. 9A and FIG. 9B illustrate the text "This is" before and after the White Fill process 300, respectively. As shown, the space between the activated subpixels that were previously turned off before the White Fill process 300 has been filled in by the White Fill process 300. This effectively makes the vertical lines appear "solid," and less dotty. Even some space is filled in in the horizontal lines, as shown in the "s" of the word "is."

Figure 10A:
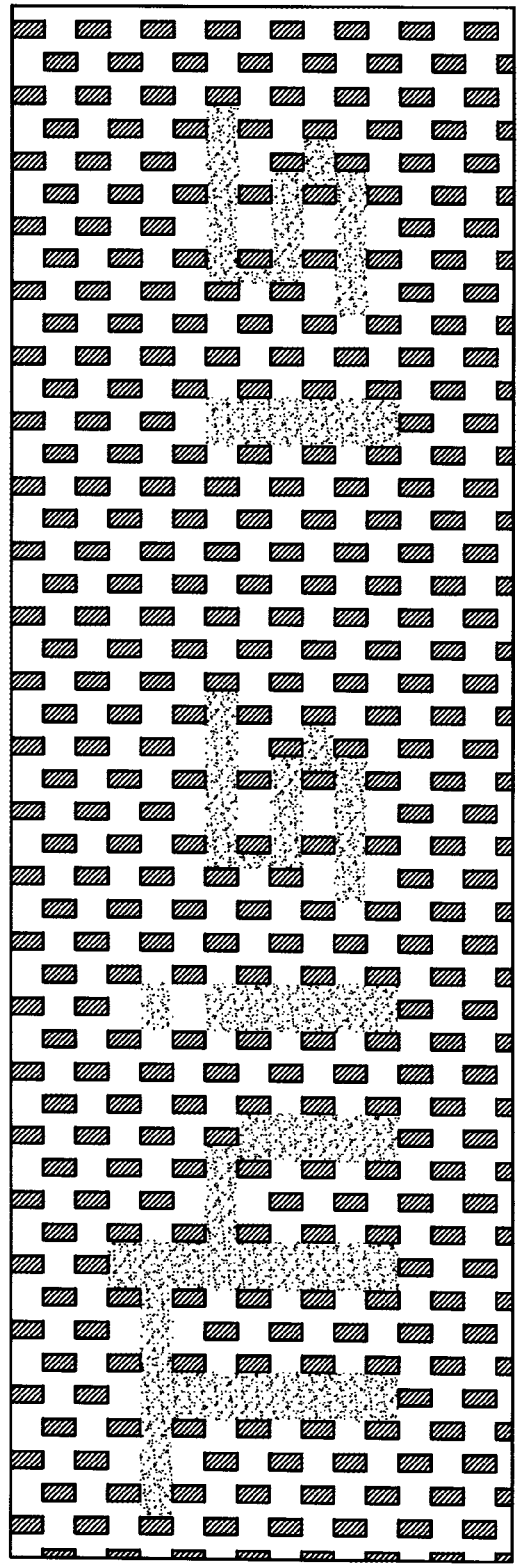
FIG. 10A and FIG. 10B illustrate the text "This is" before and after the White Fill process, respectively, where black text is displayed on a saturated-color background.
Figure 10B:
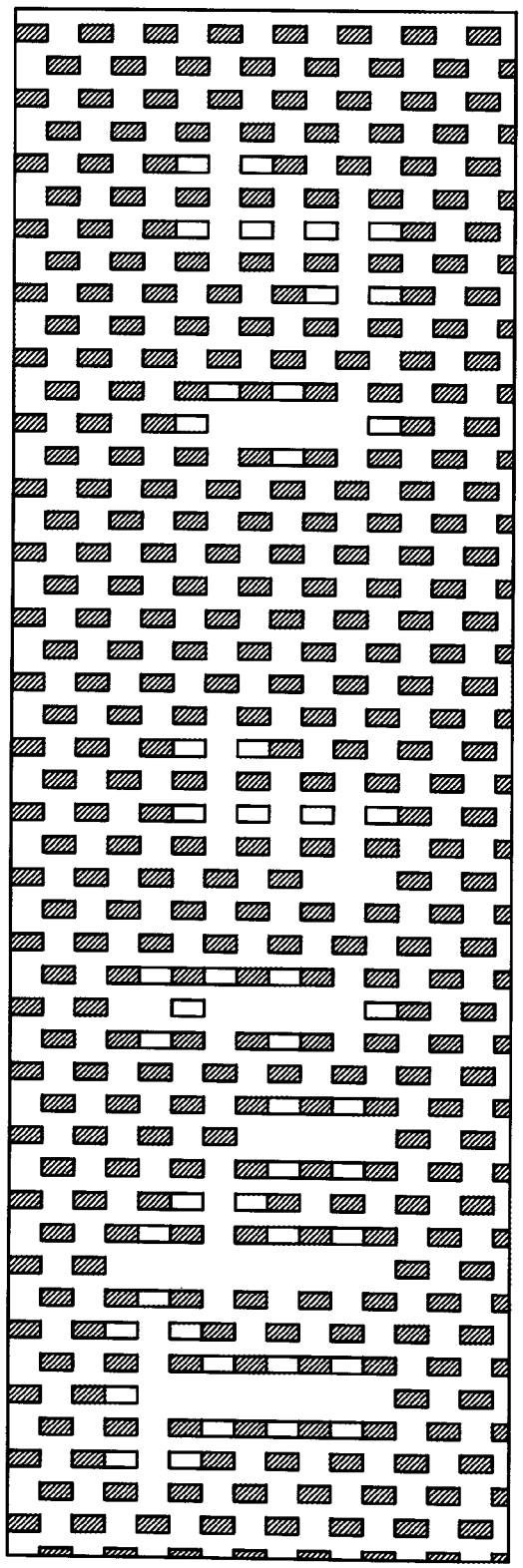

FIG. 10A and FIG. 10B illustrate the text "This is" before and after the White Fill process 300 as well. FIG. 10A and FIG. 10B depict an inverse case in which the text is black and the background is of a saturated color. In FIG. 10A, where the White Fill process 300 is not performed, the text "This is" may be difficult to read because of the dottiness at the boundary between the text and the background. After the empty spaces between the saturated subpixels along the vertical boundary portions is filled with "white," however, the text appears clearer as shown in FIG. 10B.

Colored Diagonal Test (CDIAG)

As mentioned above, the White Fill process 300 disclosed above may not be effective for improving the appearance of diagonal lines. However, a modified White Fill process, hereby referred to as a Colored Diagonal process 400, may be used for diagonal lines. To this end, a set of patterns is constructed that detect diagonal lines or parts of diagonal lines in a 3×3 subpixel area. Known pattern detectors (e.g., from a basic adaptive filtering pattern detector) may be used, enhanced by the capability to detect an inverted pattern. The ability to detect an inverted pattern would allow detection of a desaturated line on a saturated-color background. This test may be done on the center pixel and two pixels on either side of the center pixel. In one implementation, a 7×3 area may be tested by using five overlapping 3×3 tests. In the example provided, tests are performed specifically to detect green diagonal lines. However, the process disclosed here may be adapted for different-colored diagonal lines.

Figure 11:
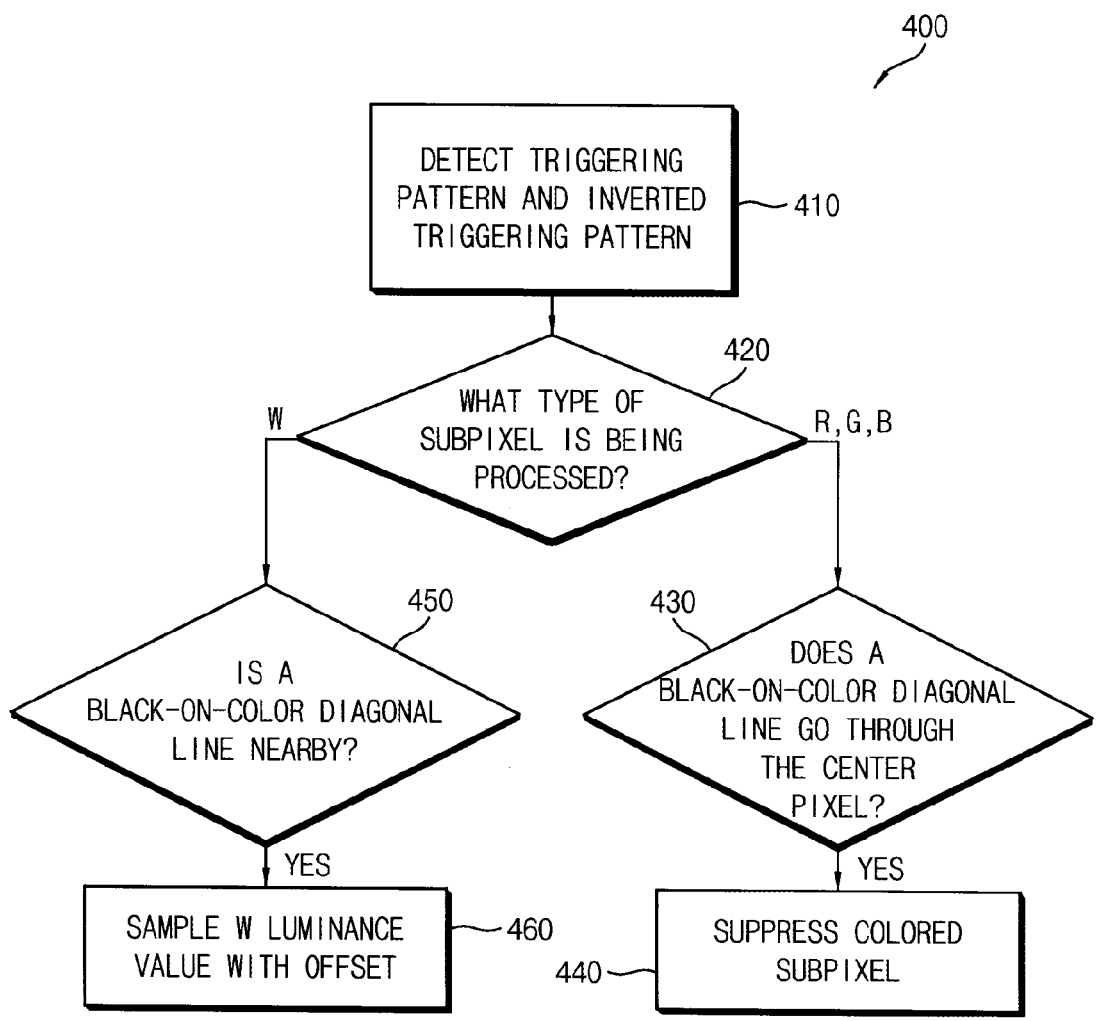
FIG. 11 is a flowchart depicting a Green Diagonal process in accordance with the enhanced adaptive filtering technique that embodies the inventive concept.

FIG. 11 is a flowchart depicting a Colored Diagonal process 400 in accordance with the enhanced adaptive filtering technique that embodies the inventive concept. The process includes detecting a triggering pattern and an inverted triggering pattern (step 410), for example by using a 3×3 pattern. A triggering pattern may be deemed as present if one of the 5 surrounding diagonal tests detects a black-on-colored line. Depending on the type of subpixel that is being processed, different tests are applied (step 420). For example, if a red, green, or blue subpixel is being processed, it is checked whether a black-on-color diagonal line goes through the center pixel (step 430). If the answer is "yes," the colored subpixel is suppressed. This suppression causes the center pixel of a black diagonal line on color to go black. The W luminance value is sampled and applied to the black-colored border (step 440). If the answer in step 430 is "no," step 410 is repeated with a different pixel.

If, in step 420, it is determined that a white subpixel is being processed, it is checked whether a black-on-color diagonal line is nearby (step 450). If the answer is "yes," and a black-on-color diagonal line goes near the center pixel (e.g., one pixel to the left or right) (step 450), then the W sub-pixel is sampled from the luminance channel with offset and sharpening may be disabled (step 460). The W is sampled with a box filter that is offset so that the result is a W subpixel on either side of the black line. The exact amount of offset depends on the relative location of the diagonal line as detected during the process 410. Examining the result bits from the diagonal test can indicate where the diagonal line is in relation to the center subpixel.

The result is to make a black-on-color diagonal line darker and to fill in the edges on both sides with W. To make the resulting luminance come out properly, the box filter results are divided by two (for two W subpixels) and by M2 to correct for the relative brightness of W to the RGB sub-pixels.

Figure 12A:
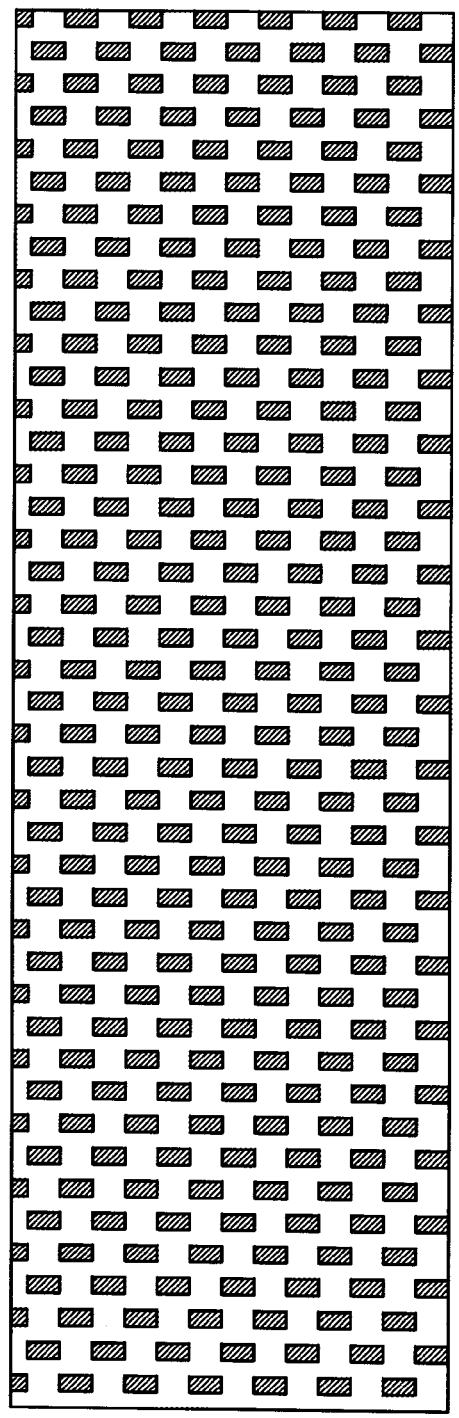
FIG. 12A and FIG. 12B illustrate the effect of moving the energy from the center green subpixel into the W sub-pixels on both sides.
Figure 12B:
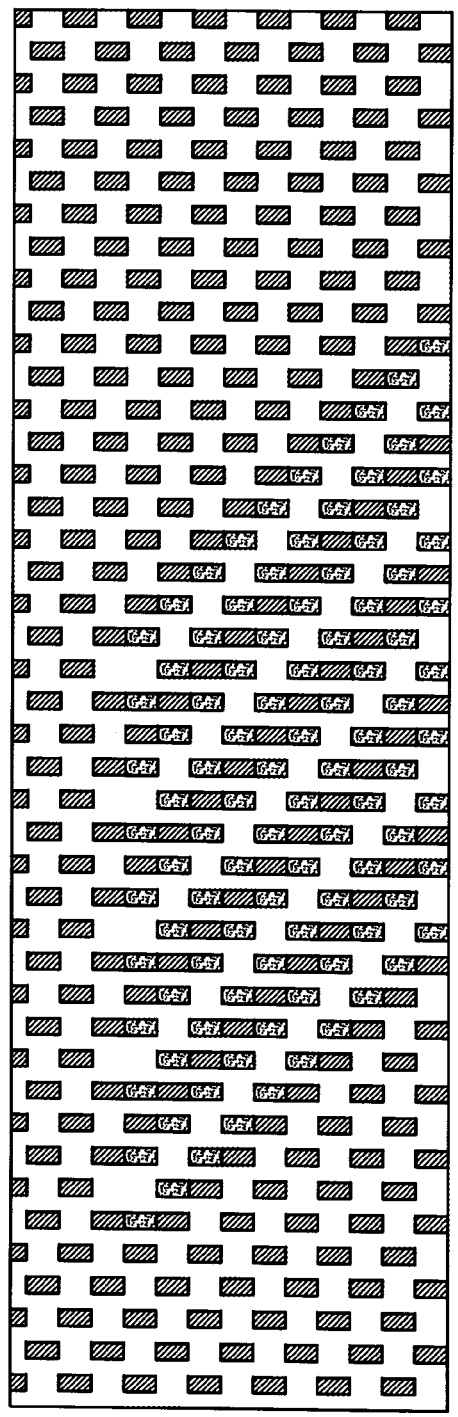

FIG. 12A and FIG. 12B illustrate the effect of moving the energy from the center colored (e.g., green) subpixel into the W sub-pixels on both sides. In FIG. 12A, which shows the black diagonal lines prior to applying the Colored Diagonal process 400, it is difficult to see the black diagonal lines because they are not distinguishable enough from other dotty black space. However, the lines become better defined after the Colored Diagonal process 400 is applied, as shown in FIG. 12B. As shown, the middle portions of the four black diagonal lines are turned black by suppression of the colored subpixel in step 440, and the borders of the diagonal lines are outlined with white subpixels. The result is a black line with white subpixels along its borders.

Adding additional diagonal tests for red will allow doing the same process for red and yellow (by testing for both). Adding diagonal tests for blue would allow doing the same process for blue, cyan, and magenta lines.

EXAMPLE

An example implementation of the methods described above is as follows:

```
-- vline is a function that detects vertical lines or parts of vertical lines
    -- it uses the BOBtest routine, part of BOBW described elsewhere
    -- this is used in the COMTEST complementary color tests.
    -- These test functions document and implement the pattern detectors.
Function vline (x, y, plane)
    if BOBtest (x, y, {
        0, 1, 0,
        0, 1, 0,
        0, 1, 0}, plane) = =1 then return 1
    end
    if BOBtest (x, y, {
        0, 0, 0,
        0, 1, 0
        0, 1, 0}, plane) = =1 then return 1
    end
    Return 0
end
    --diagt is a function that tests for diagonal lines
    --or parts of diagonals, but not dots like BOBW
    --it is used for the CDIAG tests
function diagt (x, y, plane) -check for diagonals
    if BOBtest (x, y, {
        1, 0, 0,        --diagonal left
        0, 1, 0,
        0, 0, 1}, plane) = = 1 then return 1, bobinv
    elseif BOBtest (x, y, {
        0, 0, 1,        --diagonal right
        0, 1, 0,
        1, 0, 0}, plane) = = 1 then return 1, bobinv
        --ends of diagonals
    elseif BOBtest (x, y, {
        0, 0, 0,
        0, 1, 0,
        0, 0, 1}, plane) = = 1 then return 1, bobinv
    elseif BOBtest (x, y, {
        0, 0, 0,
        0, 1, 0,
        1, 0, 0}, plane) = = 1 then return 1, bobinv
    elseif BOBtest (x, y, {
        1, 0, 0,
        0, 1, 0,
        0, 0, 0}, plane) = = 1 then return 1, bobinv
    elseif BOBtest (x, y, {
        0, 0, 1,
        0, 1, 0,
        0, 0, 0}, plane) = = 1 then return 1, bobinv
    end
return 0, 0
end -function diagt
    --in the SPR (Sub-Pixel-Rendering) code, the pattern tests are done first and saved
    --the results as single-bit variables that usually have a 0 or a 1 result
        -- Tests for BOBW
        -- the dplane function is the diagonal and isolated dot detector described
        --elsewhere
    local drtest = dplane (x, y, R)     --BOBW test in the red plane
    local dgtest = dplane (x, y, G)     --and the green plane
    local dbtest = dplane (x, y, B)     --and blue
    local dwtest = dplane (x, y, W)
            --Tests done for COMTEST vertical line detection
    local vcr = vline (x, y, R)         --pattern detect for vertical lines centered
    local vcg = vline (x, y, G)
    local vcb = vline (x, y, B)
    local vrr = vline (x-1, y, R)       --pattern detect for vertical lines shifted right
    local vrg = vline (x-1, y, G)
    local vrb = vline (x-1, y, B)
    local vlr = vline (x+1, y, R)       --pattern detect for vertical lines shifted left
    local vlg = vline (x+1, y, G)
    local vlb = vline (x+1, y, B)
        --Tests for White Fill
        --the spr. Sample sums the orthogonal threshold bits
    local gwtest = spr.sample ("flags", x, y, G, surround)     --sample the surroundings for
green
    local rwtest = spr.sample ("flags", x, y, R, surround)     --sample orthogonal
surrounding reds
            --Tests for CDIAG green diagonal (red has similar variables)
```

```
    local gwtest, g00i = diagt (x, y, G)        --center of green diagonal
    local gmtest, gmli = diagt (x-1, y, G)      --diagonal test shifted 1" left
    local gptest, gpli = diagt (x+1, y, G)      --one right
    local g2test, gm2i = diagt (x-2, y, G) -- two subpixels left
    local g3test, gp2i = diagt (x+2, y, G) -- two right, only used to exclude GRNFILL on
green sub-pixels
    --when the SPR (Sub-Pixel Rendering) is processing a RG logical subpixel,
    --the above pattern test bits are used in the following way:
If COMTEST = = 1 and nearest = = 1 then
        --If there is a yellow vertical line or to the left or right of one
        If (vcr = = 1 and vcg = = 1 and vcb = = 1) or
            (vrr = = 1 and vrg = = 1 and vrb = = 0) or
            (vlr = = 1 and vlg = = 1 and vlb = = 0) then
        lft = rds      --change the location of the sampling of the red
        lsharp = spr.sample ("gma", x-1, y, R, selfsharp) - switch to self color sharpening
        end
            --magenta, cyan tests
        If (spr.bxor(vcr, vcg) and vcb = = 1) or --detects cyan or magenta vertical lines
            (spr.bxor(vlr, vcg) and vlb = = 1) or
            (spr.bxor(vlr, vcg) and vlb = = 1) then
        bnext = bds
        bsharp = spr.sample("gma", x+1, y, B, selfsharp)
        end
end -COMTEST
    --green fill must not be used if any of the diagonal test results were positive
If GRNFILL = = 1 and br = = 0 and bg = = 0 and dgtest = = 0 and gpli = = 0 and g00i = = 0 and
gmli = = 0 and gm2i = = 0 and gp2i = = 00 then
        if gwtest < 4 and gwtest > 0 then   --4 is filled in, don't go there, 0 is outside
                rgt = spr.fetch ("gma", x, y, G)*256/2       --just sample green here
                rsharp = 0      --with no sharpening necessary
        end
end GRNFILL
    --redfill, yellowfill, etc are similar
If CDIAG = = 1 and nearsat = = 1 and dbtest = = 0 and drtest = = 0 and (g00i = = 1 or gmli = =
1) then
        rgt = 0 --drive the center green value to zero
        rsharp = 0 --disable sharpening for green
end
    --when the SPR is processing a BW logical subpixel,
    --the above pattern test result bits are used in the following way.
    --(note there is no code here for COMTEST, the W sub-pixel is not involved at all)
If GRNFILL = = 1 and br = = 0 and bg = = 1 and bb = = 0 and dgtest = = 0 and gpli = = 0 and
g00i = = 0 and gmli = = 0 and gm2i = = 0 and gp2i = = 0 then
        If gwtest <4 and gwtest >0 then     --4 is filled in, don't go there
            Rgt = spr.fetch ("gma", x, y, L) * 256/2/M2   --treat white as green, set to luma
            Rsharp =                                      --with no sharpening necessary
        End
End -GRNFILL
If CDIAG = = 1 and nearsat = = 1 and dbtest = = 0 and drtest = = 0 and (g00i = = 1 or gm2i = =
1 or gmli = = 1 or gpli = = 1) then
        If gmli = = 1 then     -use inverted detection bits to decide where to sample W
            rgt = spr.sample ("gma", x, y, L, boxfit)/2/M2
        elseif gpli = = 1 then
            rgt = spr.sample ("gma", x+1, y, L, boxfit)/2/M2
        elseif g00i = = 1 then
            rgt = spr.sample ("gma", x+1, y, L, boxfit)/2/M2
        elseif gm2i = = 1 then
            rgt = spr.sample ("gma", x-2, y, L, boxfit)/2/M2
        end
        rsharp = 0   --sharpening disabled on any CDIAG operation
end
```

Data Conversion and Adaptive Filtering

The method and apparatus disclosed above may be used with known data conversion and adaptive techniques, such as what is explained in U.S. Pat. No. 7,492,379 and summarized below.

Figure 13A:
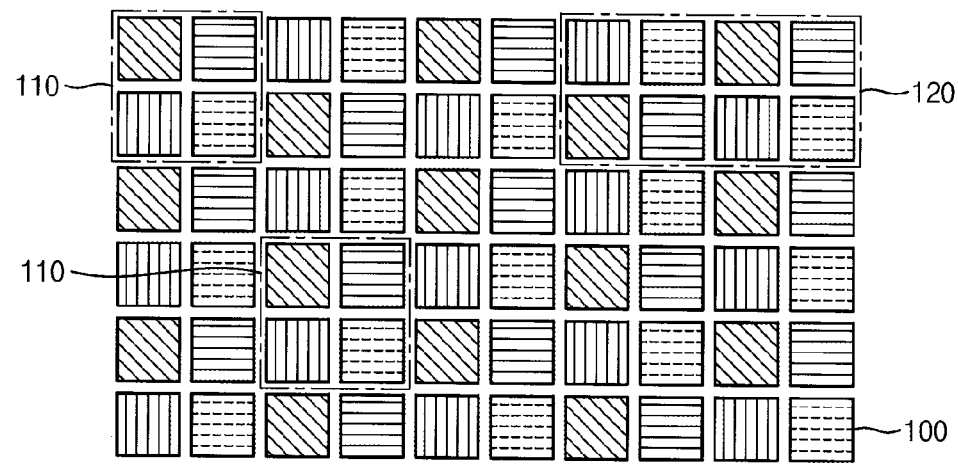
FIG. 13A shows an arrangement of four-color pixel elements in an array, in a single plane, for a display device, having a repeat cell consisting of eight subpixels.
Figure 13B:
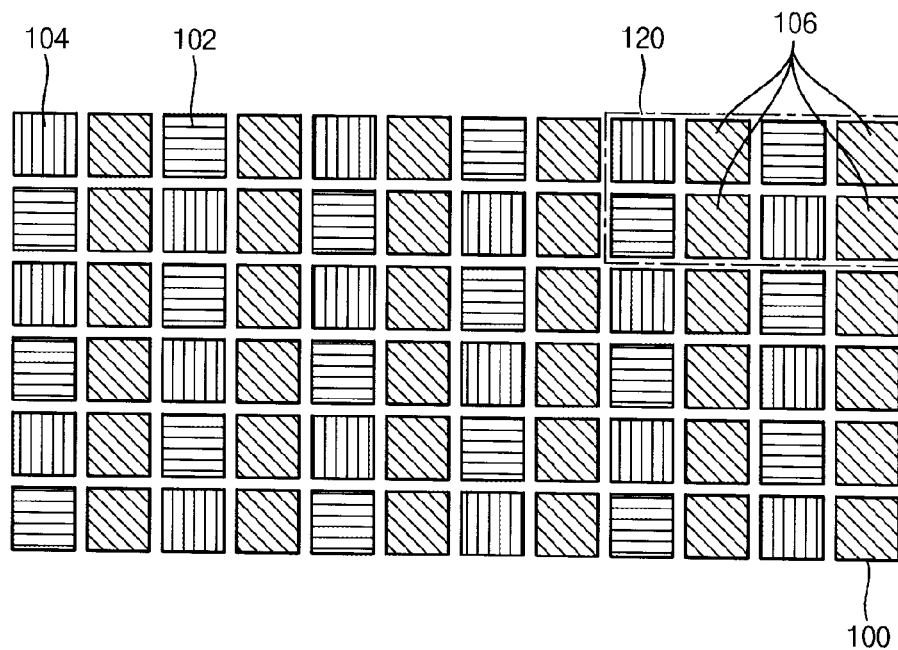
FIG. 13B shows an arrangement of three-color pixel elements in an array, in a single plane, for a display device, having a repeat cell consisting of eight subpixels generated by selecting and defining four of the eight subpixels of FIG. 13A as the same color.

FIG. 13A shows an arrangement of subpixel emitters 100 that is shifted down every other column group by one subpixel. This creates a larger rectilinarly repeating cell group 120 of eight subpixels. FIG. 13B shows a plurality of the subpixels within the repeat cell set to the same color point. In other words, FIG. 13B shows four of the emitters 106 in the eight-emitter repeat cell group 120 set to the same color. In one embodiment, these four emitters 106 may be set to be luminance-adjusted (i.e., balanced) green in color. The other subpixel emitters may be set to be red 104 and blue 102. The luminance-balanced green 106 subpixels have twice the area per color as the red 104 and blue 102 subpixels, but being balanced to have the same luminance as the red 104 subpixels, the total green energy is balanced to produce a pleasing white point when all subpixels are fully illuminated.

Figure 13C:
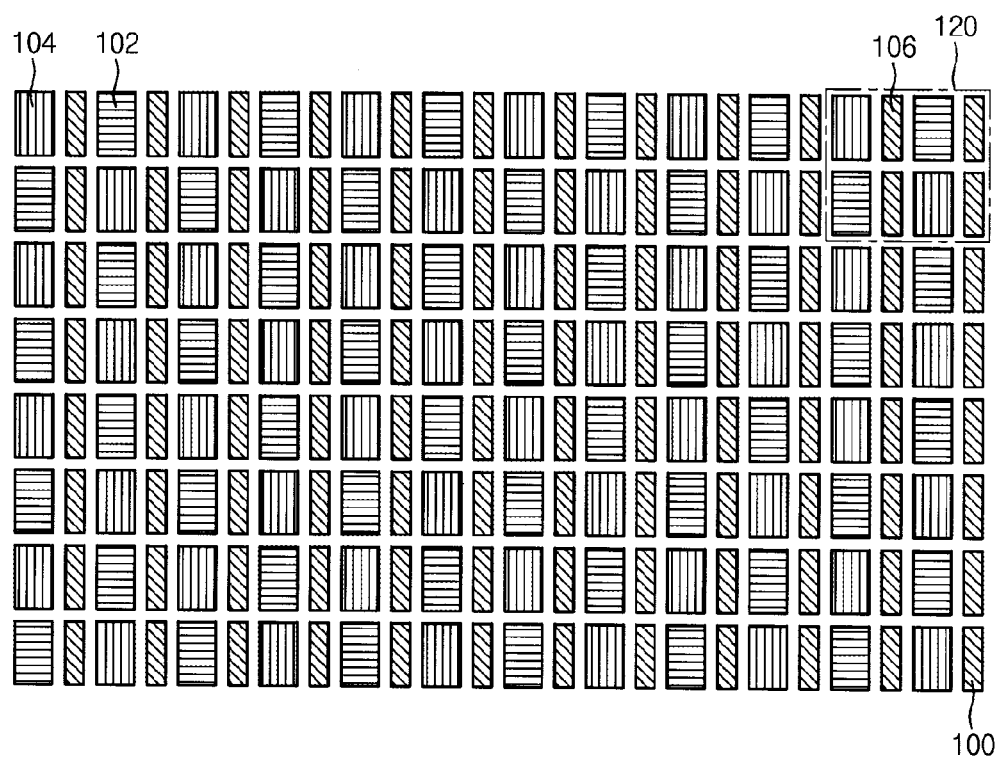
FIG. 13C shows an arrangement of three-color pixel elements in an array, in a single plane, for a display device, having a repeat cell consisting of eight subpixels generated by selecting and defining four of the eight subpixels of FIG. 13A as the same color and reducing their widths.

In FIG. 13C, the four subpixel emitters 106 are reduced in size and aspect ratio compared to the other two subpixel emitters 104, 102. The minority subpixels 104 and 102 may also be adjusted in aspect ratio. In this example, the relative size of subpixel 106 is adjusted to be one half of that of subpixels 104, 102. As before, the colors may be assigned as desired. It should also be noted that although the repeat octal grouping is shown such that the majority color subpixels occupy the second and fourth columns, it also suffices that the majority subpixels could occupy the first and the third columns as well. The subpixel colors, arrangements, and groupings provided herein are just examples and not intended to be limiting of the scope of inventive concept.

Figure 14:
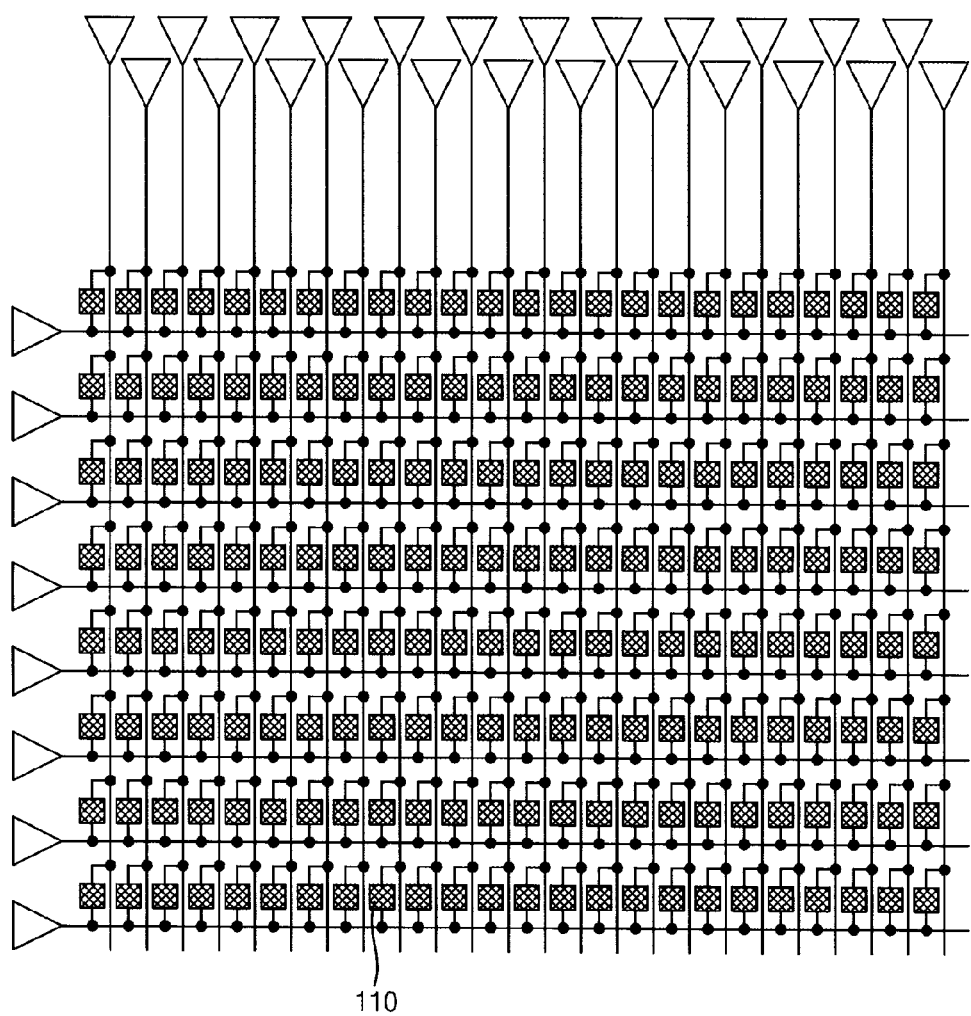
FIG. 14 shows a schematic of an electronic drive arrangement for the arrangement of subpixels shown in FIGS. 13A, 13B, and 13C.

FIG. 14 illustrates a schematic for a driver arrangement for the arrangement of color emitter subpixels in FIGS. 13A, 13B, and 13C. For convenience, the example given has the same number of subpixels illustrated as in FIG. 13C. This drive arrangement may be used for a number of display technologies, as the blocks 110 may represent one or several electrical components which are not shown so as not to obscure the embodiments. In particular, they may represent the capacitive display cell element for passively addressed Liquid Crystal Display (LCD), or electroluminescent (EL) display. They may represent the gaseous discharge element in a Plasma Display Panel (PDP). They may represent the semiconductor diode element of a passively addressed Inorganic Light Emitting Diode or an Organic Light Emitting Diode Display. They may also represent the transistor, storage capacitor, and capacitive cell element of an Active Matrix Liquid Crystal Display (AMLCD). They may further represent the multi-transistor, storage capacitor, and light emitting element of an Active Matrix Organic Light Emitting Diode Display (AMOLED). They may also represent, in general, the color subpixel and its associated electronic elements found in other known or yet-to-be-developed display technologies.

The drive timing and method may be any of those known in the art for N×M drive matrices. However, there may be modifications needed due to the specific color assignments, particularly any checkerboard across the panel or color alterations within a single column. For example, the technique known as "Multi-Row Addressing" or "Multi-Line Addressing" for passive LCD may be modified such that groupings of rows are restricted to odd and even row combinations. This will reduce potential color crosstalk since, within a column with two alternating color subpixels, only one color will be addressed at a time.

Figure 15A:
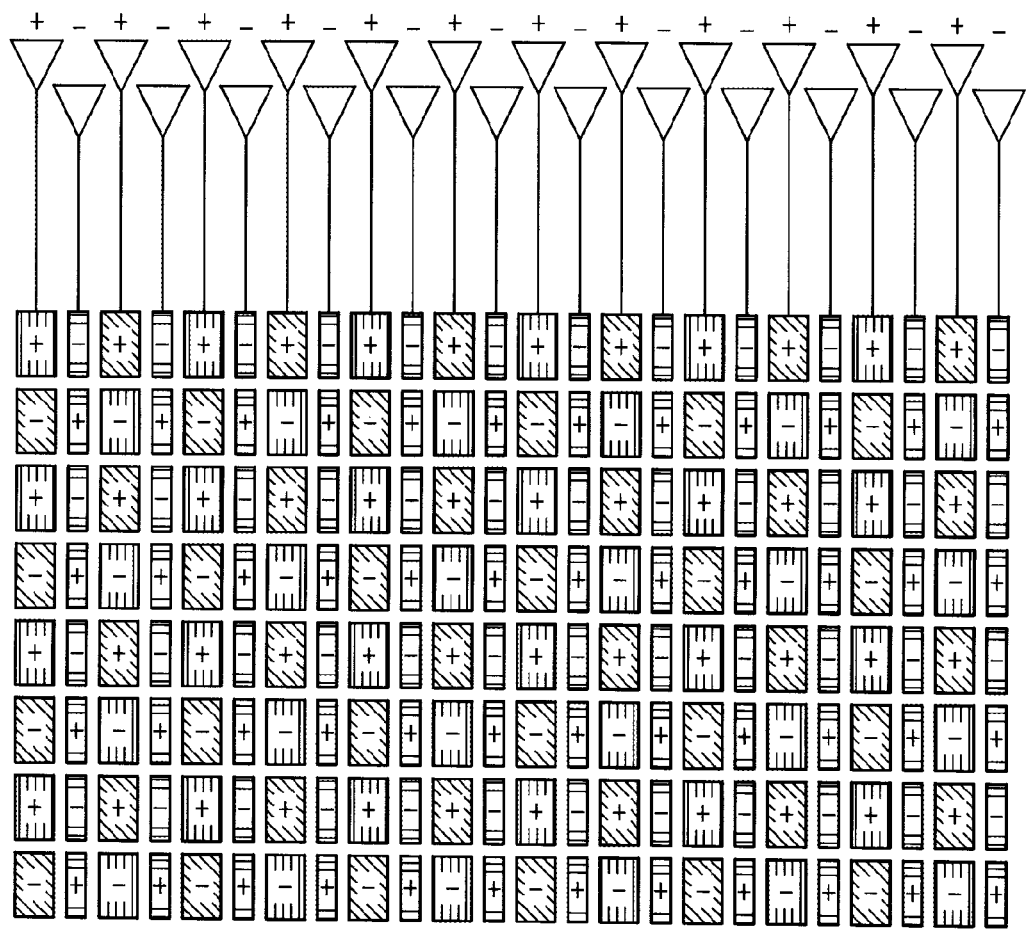
FIGS. 15A and 15B illustrate the relative polarities of active matrix dot inversion drive methods for a Liquid Crystal Display using the arrangement of color subpixels of FIG. 13C and the drive arrangement of FIG. 14.
Figure 15B:
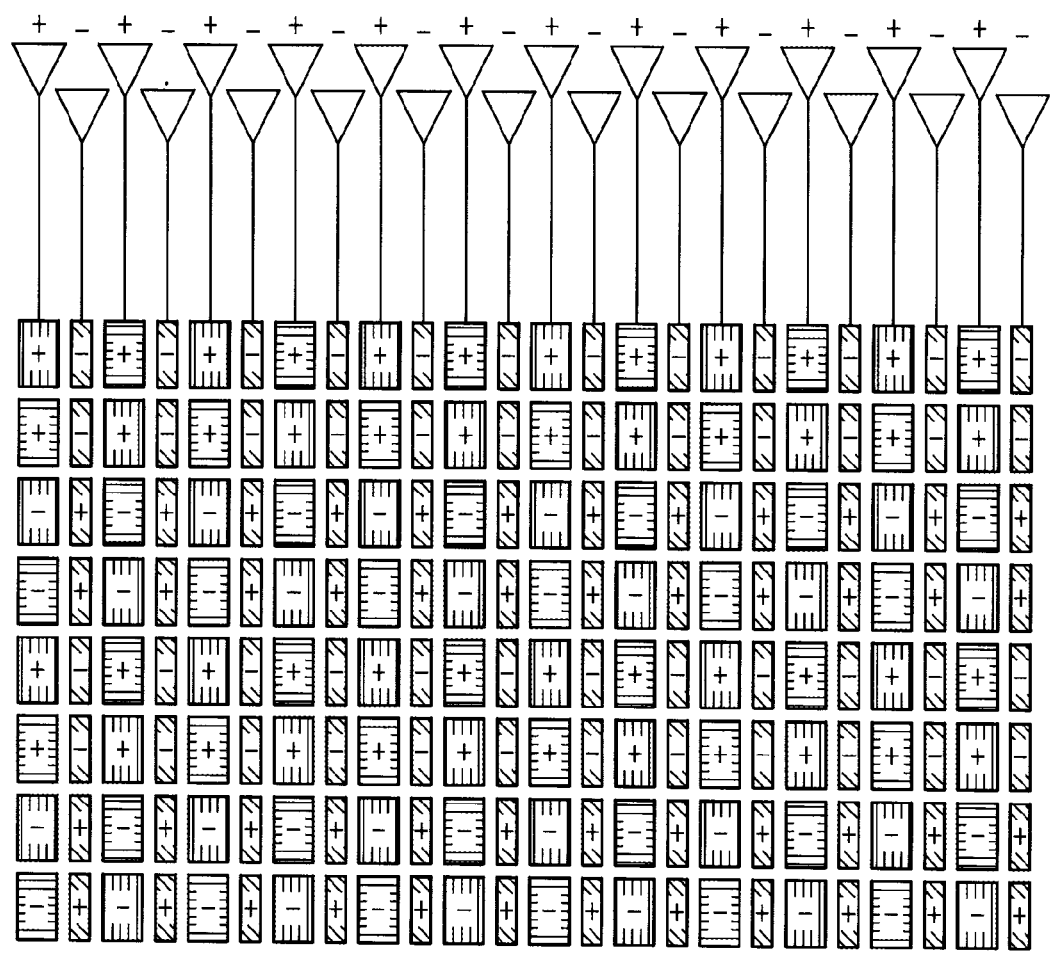

Inversion schemes, switching the electrical field polarity across the display cell to provide a time averaged zero net field and ion current across the cell, can be applied to the embodiments disclosed herein. FIGS. 15A and 15B show two "dot inversion" schemes, referred to as "1×1" and "2×1," respectively, on Active Matrix Liquid Crystal Displays, both of which will perform satisfactorily. The scheme shown on FIG. 3B may perform better when slight imbalances of light transmission occur between positive and negative polarities, especially when the eye is tracking the motion of displayed images moving across the screen. Each of the Figures shows the polarities during half of the display addressing fields. The polarities are reversed for the other half, alternating every field, resulting in a net zero current (zero DC bias), as is well known in the art.

Figure 16A:
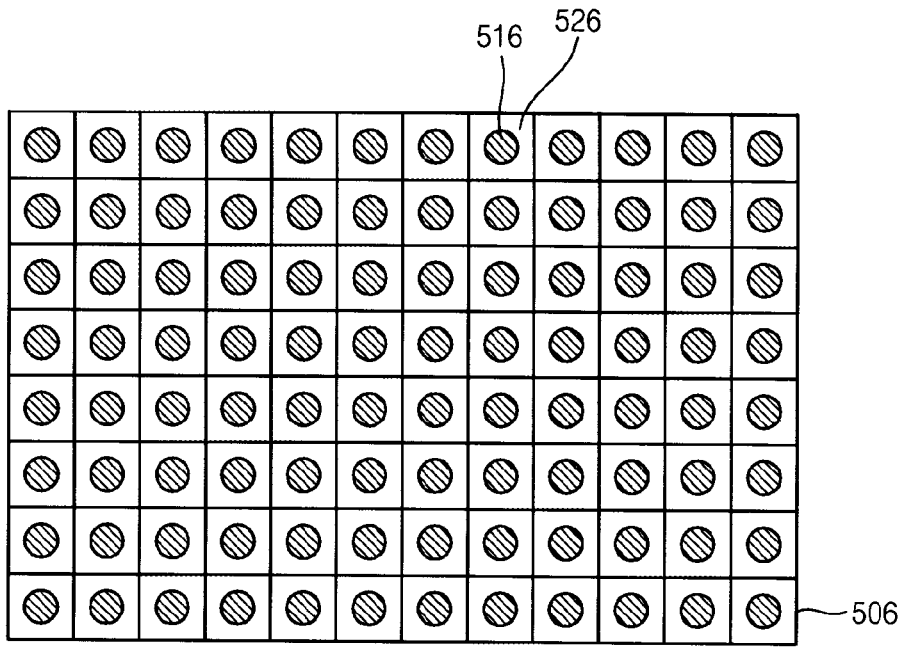
FIGS. 16A, 16B, 16C, and 16D illustrate a set of green, blue, and red resample areas separately and overlaid, respectively, for the arrangement of subpixels of FIG. 13C.
Figure 16B:
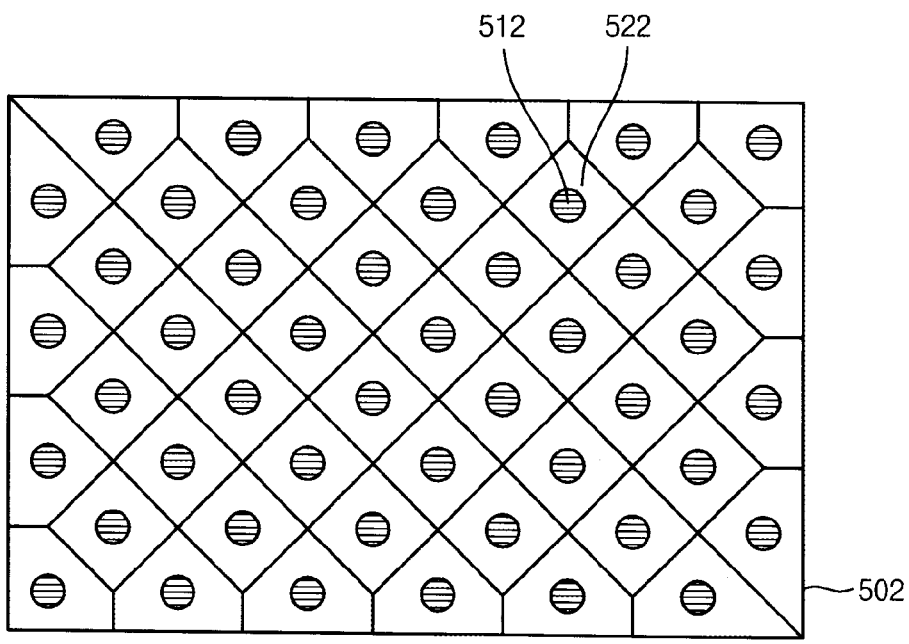
Figure 16C:
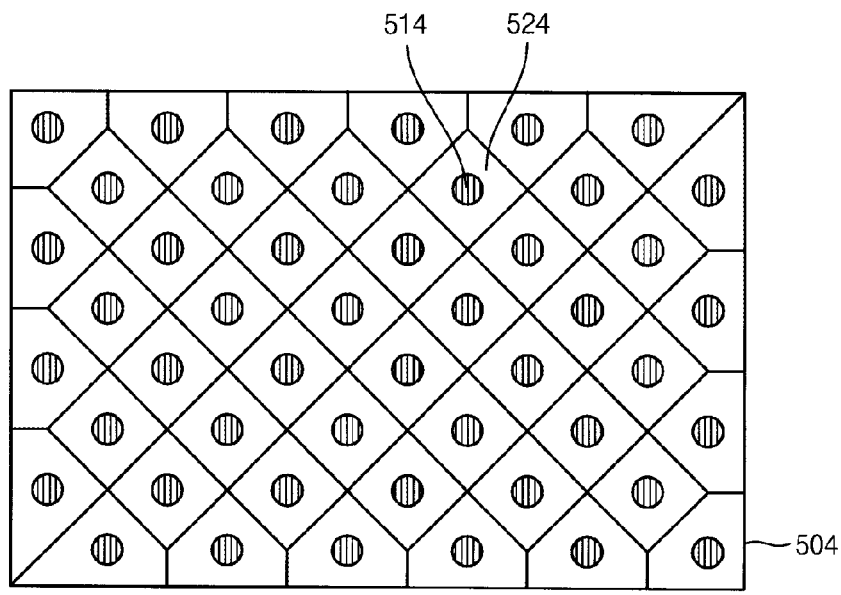

In one embodiment of data format conversion using area resampling techniques, FIGS. 16A, 16B, and 16C illustrate green 506, blue 502, and red 504 resample area arrays for the green, blue, and red color planes, respectively. Note that each color resample area array 506, 502, and 504 consists of resample areas 526, 522, and 524 and that each resample area has an associated resample point 516, 512, and 514, respectively, associated with it. The resample points 516, 512, and 514 match the relative positions of the green, blue, and red subpixel locations respectively, within each color plane; but not necessarily their exact inter-color-plane-phase relationships. It should be appreciated that any number of phase relationships are also possible.

Figure 16D:
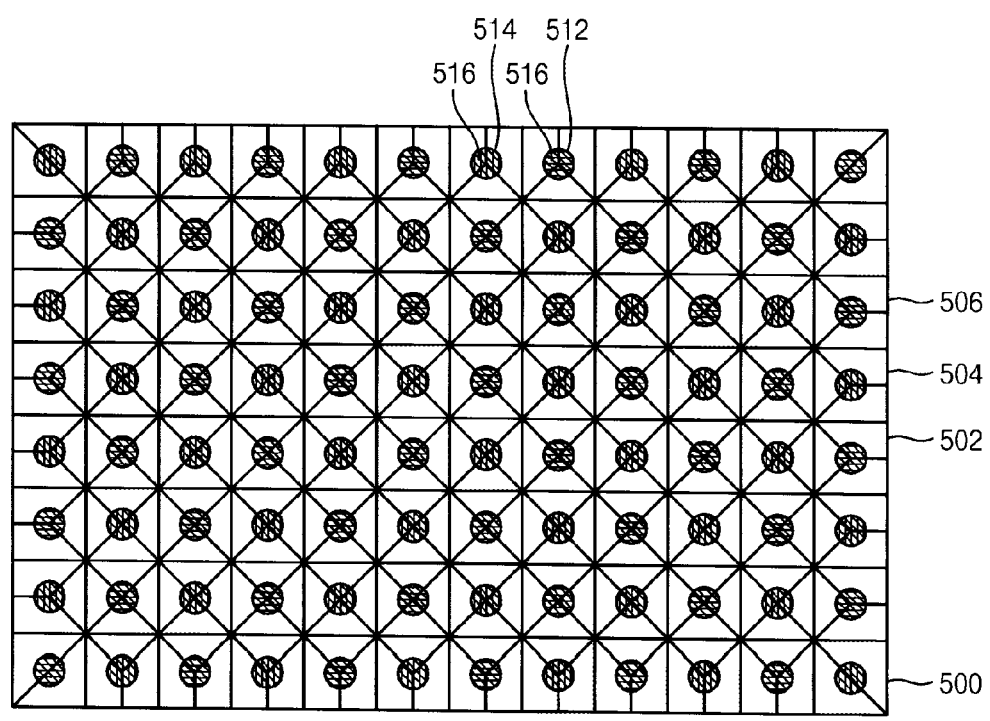

FIG. 16D illustrates one particular inter-color-plane-phase relationship 400. This relationship might be employed to convert the conventional fully-converged square grid RGB format which is to be displayed "one-to-one" with the square green subpixel grid of FIG. 13C. In this inter-color-plane-phase relationship 500, the green 506, blue 502, and red 504 resample area arrays are substantially positioned such that the red 514 and blue 512 resample points overlap the green 516 sample points. This treats the green subpixels 106 as though they lay on top of, or intimately associated with, the red 104 and blue 102 subpixel checkerboard.

Figure 17A:
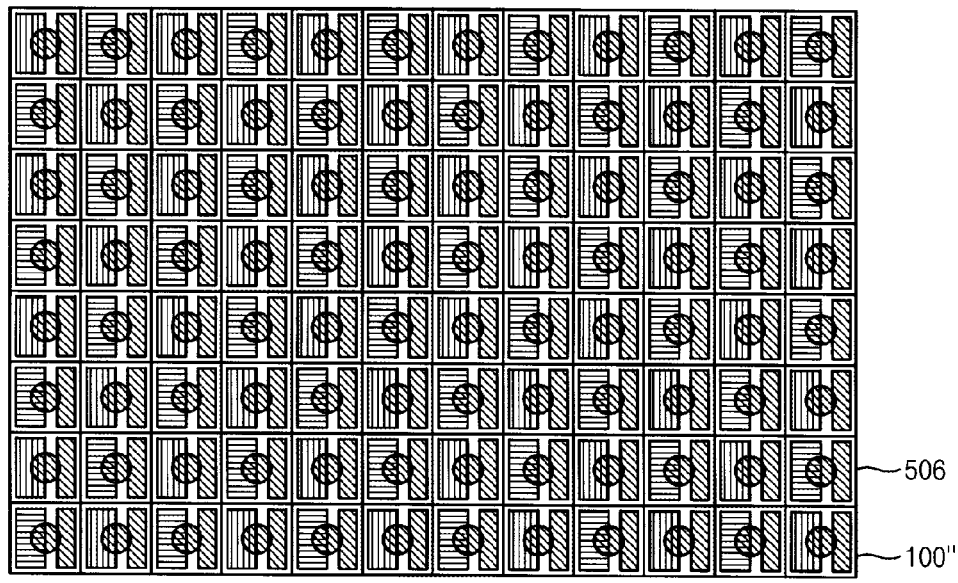
FIGS. 17A, 17B, 17C, and 17D illustrate the set of green, blue, and red resample areas of FIGS. 16A, 16B, 16C, and 16D, respectively, overlaid on the arrangement of subpixels of FIG. 13C to show their relative positions.
Figure 17B:
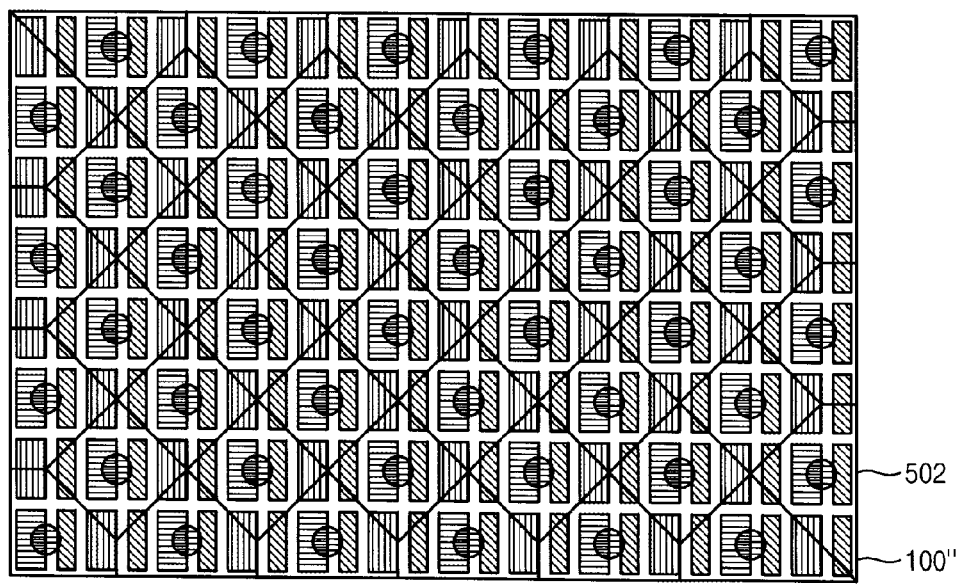
Figure 17C:
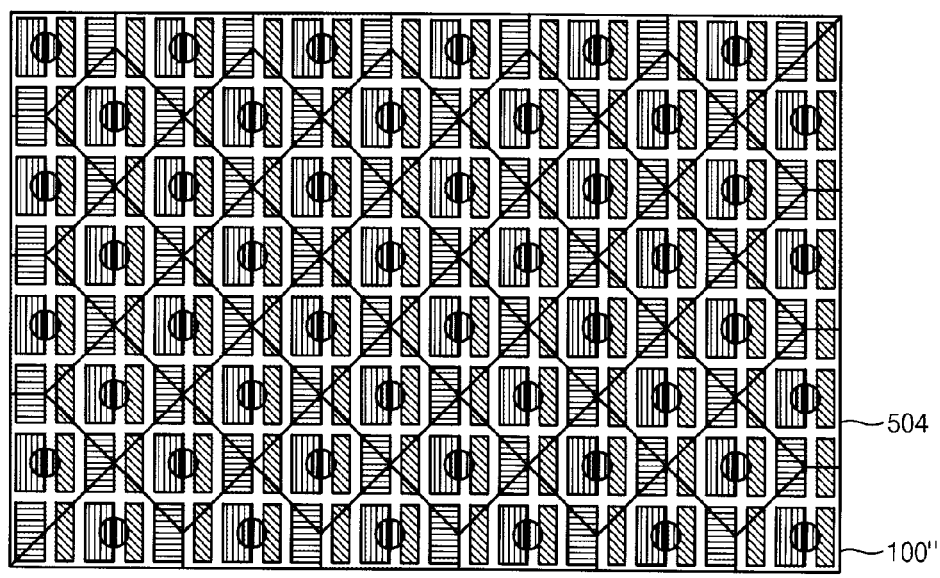

FIGS. 17A, 17B, and 17C illustrate the green 506, blue 502, and red 504 resample area arrays of FIGS. 16A, 16B, and 16C overlaid on the subpixel arrangement of FIG. 13C, respectively, with the inter-color-plane-phase relationship of FIG. 15D. FIG. 16D illustrates the inter-color-plane-phase relationship 500 of FIG. 16D overlaid on the subpixel arrangement of FIG. 13C. These figures are merely illustrative and serve to provide an understanding of the relationship between the resample points, reconstruction points, resample areas, and subpixel locations for this embodiment.

One method of converting the incoming data format to that suitable for a particular display is as follows: (1) determining implied sample areas for each data point of incoming three-color pixel data; (2) determining a resample area for each color subpixel in the display; (3) forming a set of coefficients for each resample area, the coefficients comprising fractions whose denominators are a function of the resample area and whose numerators are a function of an area of each implied sample area that may partially overlap the resample area; (4) multiplying the incoming pixel data for each implied sample area by the coefficient resulting in a product; and (5) adding each product to obtain luminance values for each resample area.

Figure 17D:
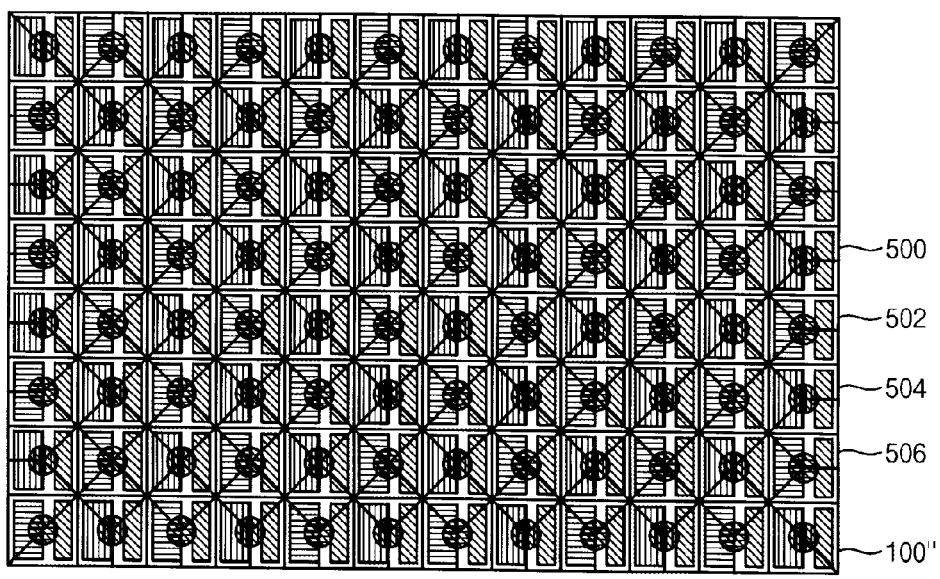

Examining a "one-to-on" formal conversion case for the resample operation illustrated in FIGS. 16D and 17D, the green plane conversion is a unity filter. The red and blue color planes use a 3×3 filter coefficient matrix, derived for example according to the process explained in U.S. Patent Application Publication No. 2003/0103058:

| 0 | 0.125 | 0 |
|---|---|---|
| 0.125 | 0.5 | 0.125 |
| 0 | 0.125 | 0 |

Figure 17E:
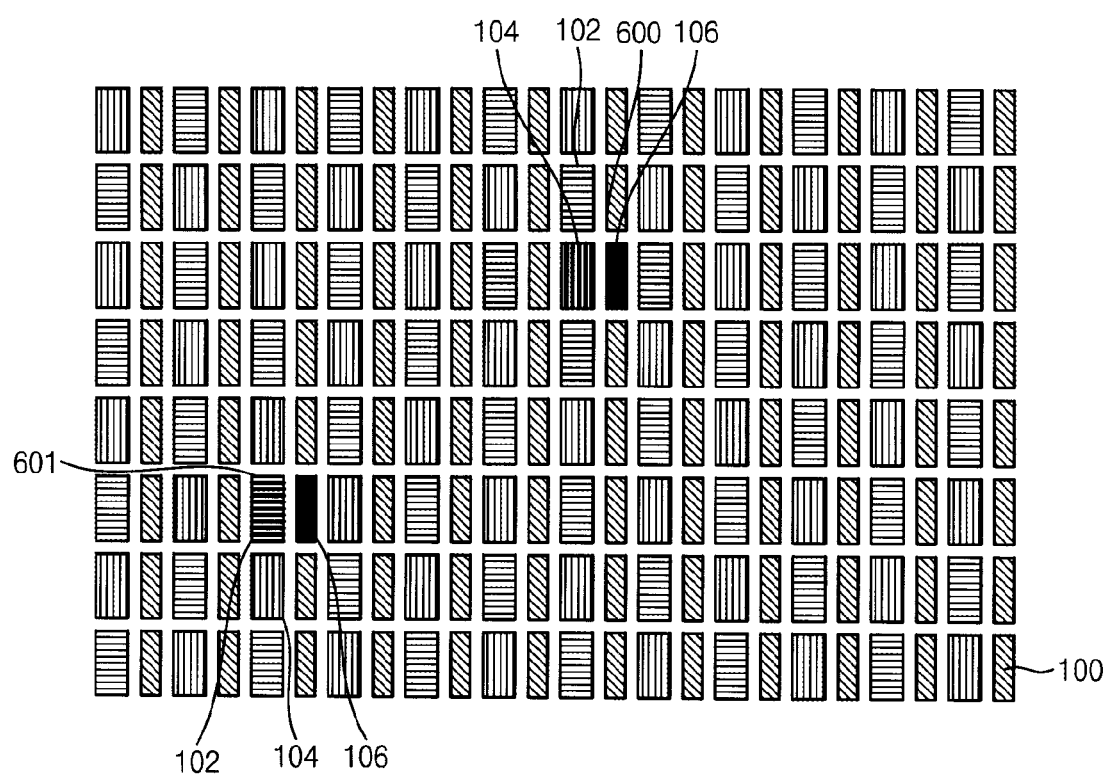
FIG. 17E illustrates two logical pixels displayed on the arrangement of FIG. 13C, resulting from the subpixel rendering operation of the resample areas of FIG. 16D.

FIG. 17E illustrates the results of turning on two full color incoming data pixels. The two pixels are converted to two clusters of output subpixels, called "logical pixels" 600 and 601, turned on at varying amplitudes. One of the logical pixels 600 is centered on or near a red subpixel 104. The green subpixel 106 is set at 100% illumination. The red subpixel 104 is set to 50% illumination, while the four surrounding blue subpixels 102 are set to 12.5% each. The result is a white dot visible to the human eye, centered between the red 104 and the green 106 subpixels. The other logical pixel 601, centered on or near blue subpixel 102, similarly has the green subpixel 106 set to 50% with the four surrounding red subpixels 104 set at 12.5% each.

Figure 18A:
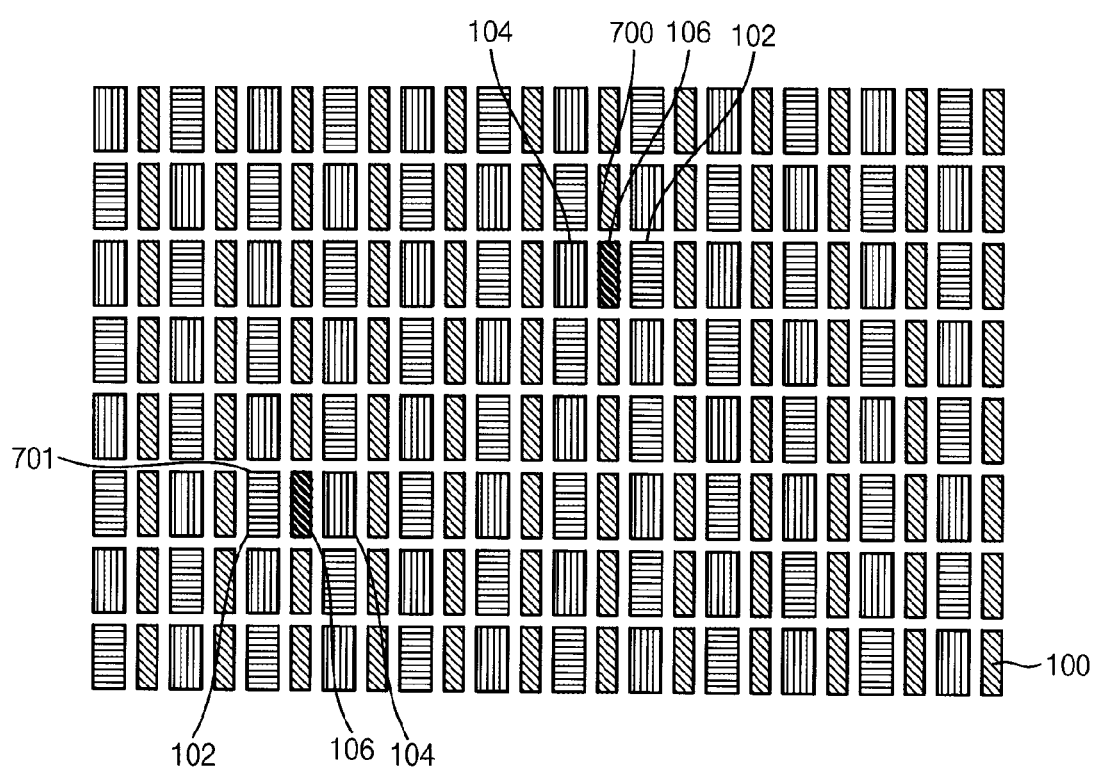
FIG. 18A illustrates two logical pixels displayed on the arrangement of FIG. 13C, resulting from the subpixel rendering operation of the resample areas of FIG. 18D.
Figure 18B:
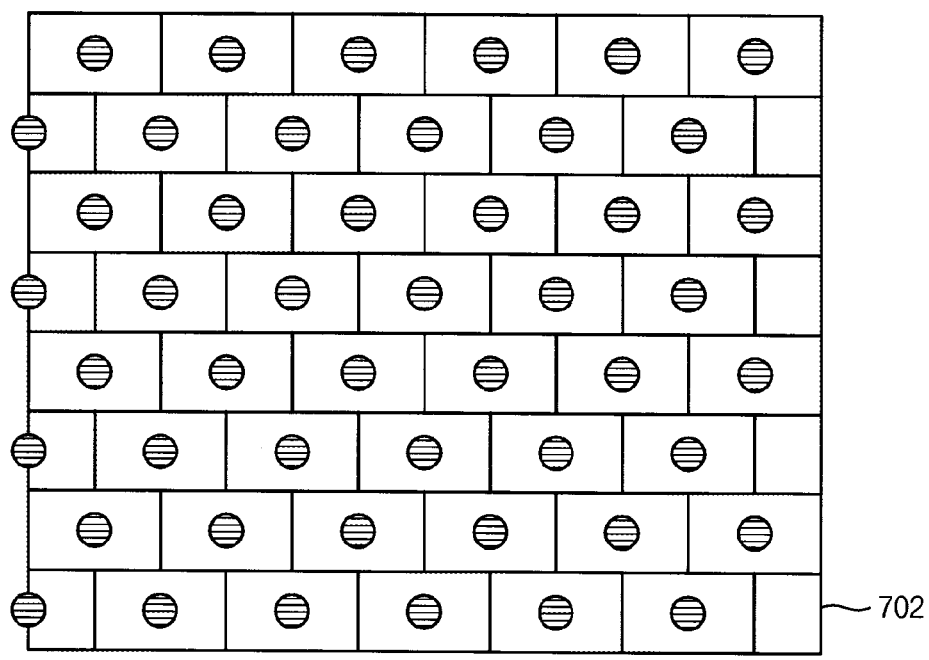
FIGS. 18B, 18C, and 18D illustrate a set of blue and red resample areas separately, and overlaid along with the green resample areas illustrated in FIG. 16A on arrangement of subpixels of FIG. 13C, respectively.
Figure 18C:
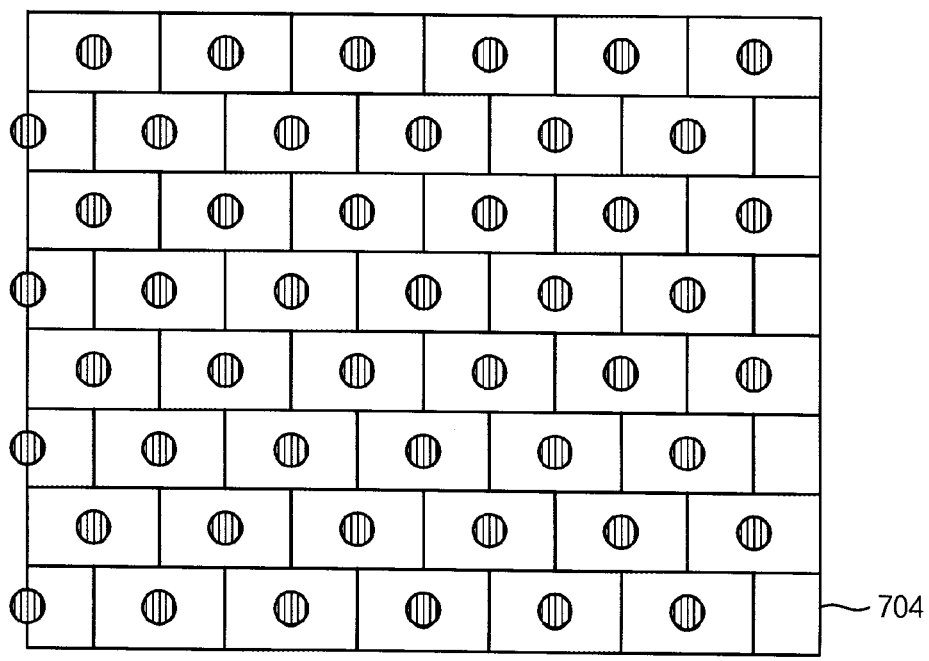
Figure 18D:
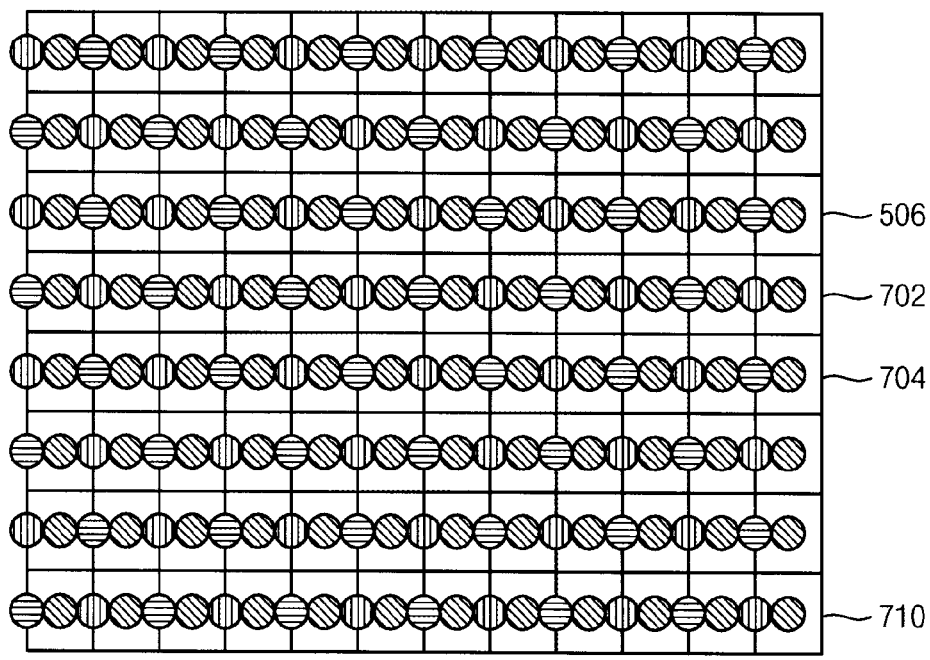

FIGS. 18B and 18C show an alternative blue color plane resample area array 702 and an alternative red color plane resample area array 704, respectively—shown herein as box filters ([0.5, 0.5])—to replace the blue and red resample area arrays 402 and 404 of FIGS. 16B and 16C, respectively. FIG. 18D illustrates an inter-color-plane-phase relationship

610 using the green resample area array 506 of FIG. 16A, and blue and red resample area arrays 702 and 704. FIG. 18A shows the logical pixels 700 and 701 that result from turning on two input data format pixels using the resample operation of the inter-color-plane-phase relationship 610 (FIG. 18D) from input data with a "one-to-one" pixel to green subpixel 106 mapping. These logical pixels 700 and 701 may be in the same relative positions as the two logical pixels 600 and 601 in FIG. 17E. Also, it may be possible to center the green box filter to match substantially an input pixel by adjusting the grid slightly.

Adaptive filtering techniques may also be implemented with the pixel arrangements disclosed herein, as further described below.

Again, the green resample uses a unitary filter. The red and blue color planes use a very simple 1×2 coefficient filter: [0.5 0.5].

The concept of adaptive filtering is generally known, and details about an example adaptive filtering may be found in U.S. Patent Publication No. 2003/0085906. The 3×3 method disclosed in that application may be adopted so as not to require a 3×3 sample of input data, which uses a minimum of two lines of memory. The test may be based on a smaller sample of input data, such as 1×3 or 1×2 matrices. The green data is sampled to test for vertical or diagonal lines and then the red and blue data adjacent to the green test point may be changed.

An adaptive filter test could be implemented as follows to test to see if a high contrast edge is detected: compare the green data (G) to a minimum value and a maximum value—if G<min or G>max, then a register value is set to 1, otherwise the register value is set to 0; compare the register values for three successive green data points to test masks to see if an edge is detected; if an edge is detected, then take an appropriate action to the red and/or blue data—e.g., apply gamma or apply a new value or different filter coefficient.

The table below illustrates this example:

| Data (for 3 successive points) | 0.98 | 0.05 | 0.0 |
|---|---|---|---|
| Low Test (G < 0.1) | 0 | 1 | 1 |
| High Test (G > 0.9) | 1 | 0 | 0 |
| Compare low and NOT high | True | True | True |

For the example above, an edge has been detected and there is an array of options and/or actions to take at this point. For example, the gamma correction could be applied to the output of the box filter for red and/or blue; or a new fixed value representing the output required to balance color could be used; or use a new SPR filter.

The test for black lines, dots, edges and diagonal lines are similar in this case, since only three values are examined:

|   | Register Value |   |   | Binary No. |
|---|---|---|---|---|
| 1. | 1 | 0 | 1 | 5 |
| 2. | 1 | 1 | 0 | 6 |
| 3. | 0 | 1 | 1 | 3 |
| 4. | 0 | 1 | 0 | 2 |
| 5. | 0 | 0 | 1 | 1 |
| 6. | 1 | 0 | 0 | 4 |

In the above table, the first row could represent a black pixel with white pixels on either side. The second row could represent an edge of a black line or dot. The third row could represent an edge of a black line in a different location. The binary numbers are used as an encoding for the test.

The test for white lines, dots, edges, and diagonal lines might be as follows:

If the tests are true and the high and low tests are, for example, 240 and 16 (out of 255) respectively, then the output value for these edges using the box filter might be 128+/−4 or some other suitable value. The pattern matching is to the binary numbers shown adjacent to the register values. A simple replacement of 128 raised to an appropriate gamma power could be output to the display. For example, for gamma=2.2, the output value is approximately 186. Even though the input may vary, this is just an edge correction term so a fixed value can be used without noticeable error. Of course, for more precision, a gamma lookup table could likewise be used. It should be appreciated that a different value, by possibly similar, of correction could be used for white and black edges. It should be appreciated that as a result of detecting an edge, the red and/or blue data could be acted on by a different set of filter coefficients—e.g., apply a [1 0] filter (i.e. unity filter) which would effectively turn off subpixel rendering for that pixel value.

The above tests were primarily for a green test followed by action on red and blue. Alternatively, the red and blue can be tested separately and actions taken as needed. If one desired to apply the correction for just black and white edges, then all three color data sets can be tested and the result ANDed together.

A further simplification could be made as follows. If only two pixels in a row are tested for edges, then the test above is further simplified. High and low thresholding may still be accomplished. If [0 1] or [1 0] is detected, then a new value could be applied—otherwise the original value could be used.

Yet another simplification could be accomplished as follows (illustrated for the red): subtract the red data value, $R_n$, from the red value immediately to the left, $R_{n-1}$; if the delta is greater than a predetermined number—e.g., 240—then an edge is detected. If an edge is detected, one could substitute a new value, or apply gamma, output the value Rn to the display, or apply new SPR filter coefficients; otherwise, if no edge is detected, output the results of the box filter to the display. As either Rn or Rn−1 may be larger, the absolute value of the delta could be tested. The same simplification could occur for the blue; but the green does not need to be tested or adjusted, if green is the split pixel in the grouping. Alternatively, a different action could be taken for falling edges (i.e. $R_n - R_{n-1} < 0$) and rising edges (i.e., $R_n - R_{n-1} > 0$).

The results are logical pixels 700, 701 that have only three subpixels each. For a white dot and using a box filter for red and blue data, the green subpixels 106 are set to 100% as before. The nearby red 104, as well as the nearby blue 102, could be all set to 50%. The resample operation of inter-color-plane-phase relationship 610 of FIG. 6D is very simple and inexpensive to implement, while still providing good image quality.

Both of the above data format conversion methods match the human eye by placing the center of logical pixels at the numerically superior green subpixels. The green subpixels are each seen as the same brightness as the red subpixel, even though half as wide. Each green subpixel 106 acts as though it were half the brightness of the associated logical pixel at every location, while the rest of the brightness is associated with the nearby red subpixel illuminated. Thus, the green serves to provide the bulk of the high resolution luminance modulation, while the red and blue provide lower resolution color modulation, matching the human eye.

Figure 19A:
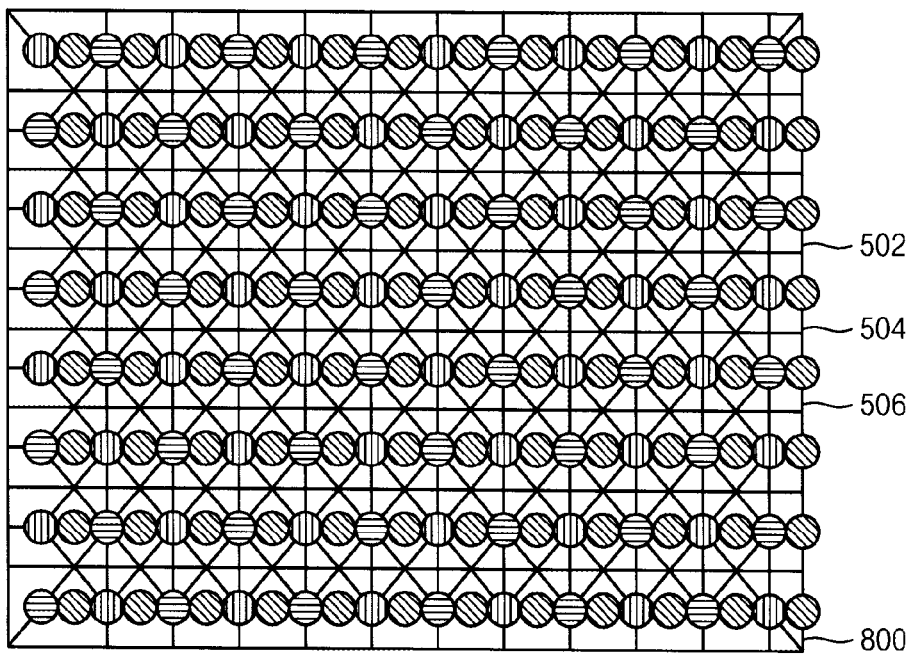
FIG. 19A illustrates the set of green, blue, and red resample areas of FIGS. 4A, 4B, and 4C respectively, overlaid to show their relative positions.
Figure 19B:
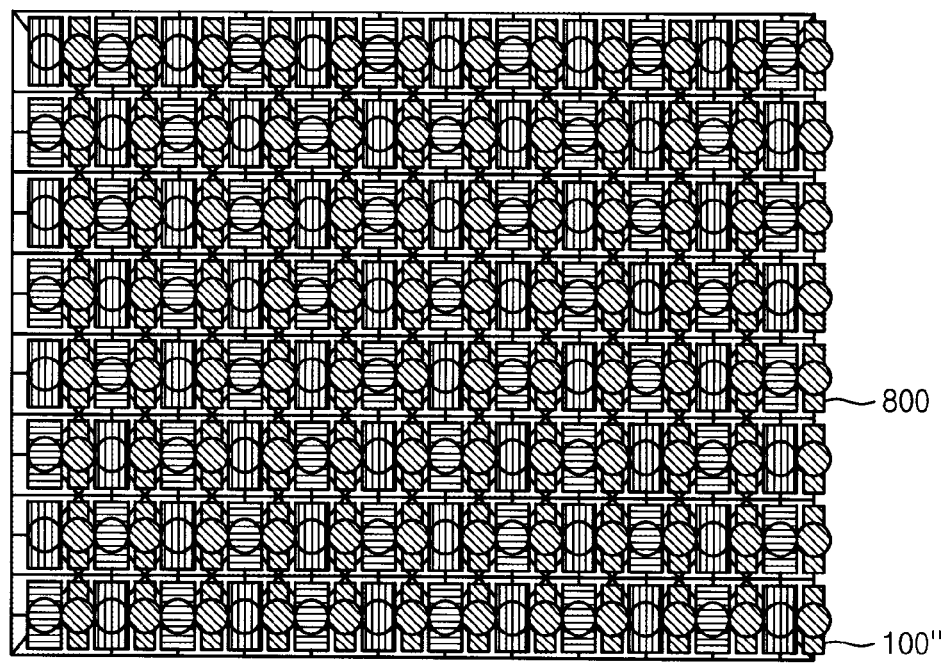
FIG. 19B illustrates the arrangement of resample areas of FIG. 19A overlaid on the arrangement of subpixels of FIG. 13C to show their relative positions.
Figure 20A:
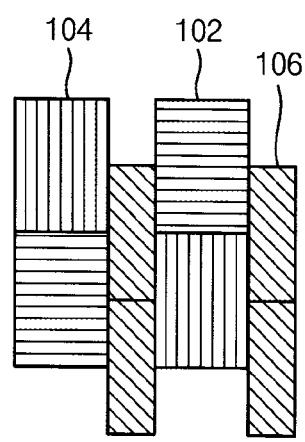
FIGS. 20A and 20B show other embodiments of the octal subpixel arrangement with various vertical displacements of the subpixels.
Figure 20B:
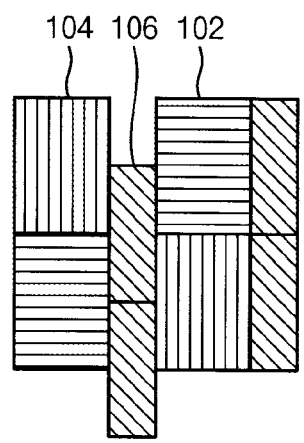
Figure 21A:
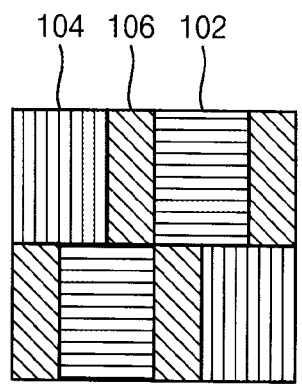
FIGS. 21A and 21B show yet other embodiments of the octal subpixel arrangement of various displacements of the split majority subpixel within the subpixel grouping.
Figure 21B:
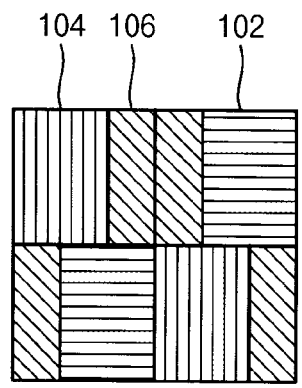

FIG. 19A illustrates an alternative inter-color-plane-phase relationship 800 using the green, blue, and red resample area arrays 506, 502, and 504 of FIGS. 16A, 16B, and 16C. Note that inter-color-plane-phase relationship 808 has the same relative phase as color subpixel arrangement 100 of FIG. 13C as illustrated in FIG. 19B. The relative phases of the resample points of inter-color-plane phase relationship 800 is similar to that for inter-color-plane-phase relationship 710 of FIG. 18D. If this inter-color-plane-phase relationship 800 were used for the "one-to-one" data format conversion, the green would again be a unitary filter, while the red and blue would use 3×2 coefficient filter kernel:

| | |
|---|---|
| 0.0625 | 0.0625 |
| 0.375 | 0.375 |
| 0.0625 | 0.0625 |

Note that the two columns add up to 0.5 each, similar to the coefficients for the red and blue resample filter operation for the inter-color-plane-phase relationship 710 of FIG. 18D.

This inter-color-plane phase relationship 800 shown in FIG. 19A is useful for scalding, both up and down, of conventional format data sets. The area resample method of calculation of the filter coefficients and keeping track of the input and output data buffers is known. However, according to another embodiment, while the red and blue color planes may be area-resampled, it may be advantageous to calculate the filter coefficients for the square grid of green subpixels 106 using a novel implementation of a bi-cubic interpolation algorithm for scaling up data sets while converting them to be displayed on the arrangement of color subpixels 100 of FIG. 13C.

Figure 22:
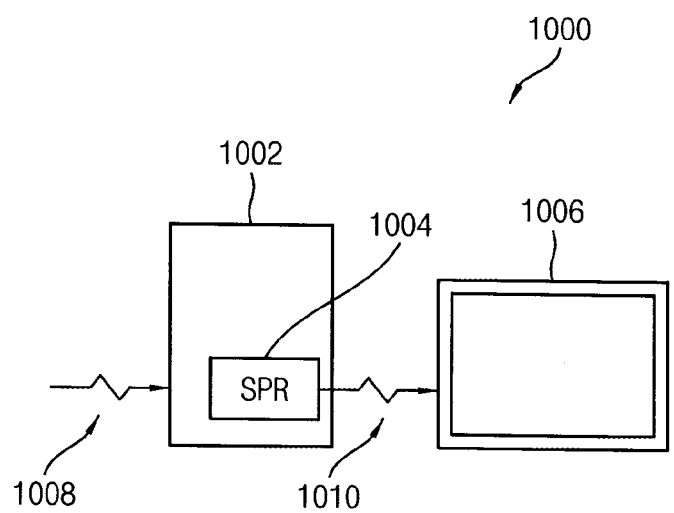
FIG. 22 depicts a system incorporating subpixel rendering techniques suitable to drive a panel made in accordance with the embodiments described herein.

FIG. 22 depicts a system 1000 in which a display s constructed in accordance with the various embodiments disclosed herein is driven by a subpixel rendering technique 1004 which may be resident on a physical device 1002. An input image data stream 1008 may be input into the subpixel rendering technique 1004 and converted in the manner herein disclosed. An output image data stream 1010 is sent to the display device 1006 in order to drive the various subpixels to form an image thereupon. As discussed in several references incorporated herein, the subpixel rendering (SPR) technique 1004 may be implemented in either hardware and/or software or a combination thereof. For example, SPR techniques 1004 could be resident as logic (either hardware or software) on the display itself or it could reside on a graphics controller chip or board.

Figure 23A:
FIGS. 23A and 23B depict two particular embodiments of flowcharts to perform software and hardware subpixel rendering on a suitable display.
Figure 23B:
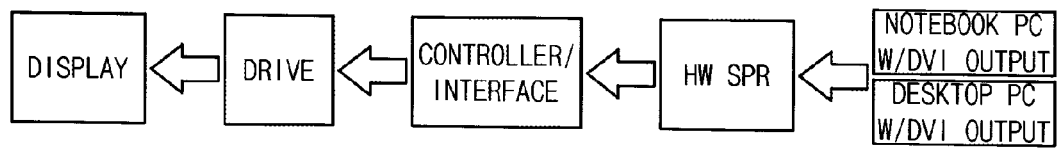

FIGS. 23A and 23B depict two particular flowchart embodiments disclosing subpixel rendering in software and hardware, respectively. In FIG. 23A, SPR may be accomplished in advance on a PC or other processing system and/or means. From there, the pre-rendered images could be downloaded to a controller/interface and sent along to a drive running the display. In FIG. 23B, image data may be input from many different sources—for example, a notebook PC with DVI output or a desktop with DVI output—to a hardware module doing SPR. From there, the subpixel rendered data could be sent ultimately to the display via a controller/interface and a drive. Of course, other hardware and software implementations are possible and FIGS. 23A and 23B merely describe two possible implementations.

Figure 24:
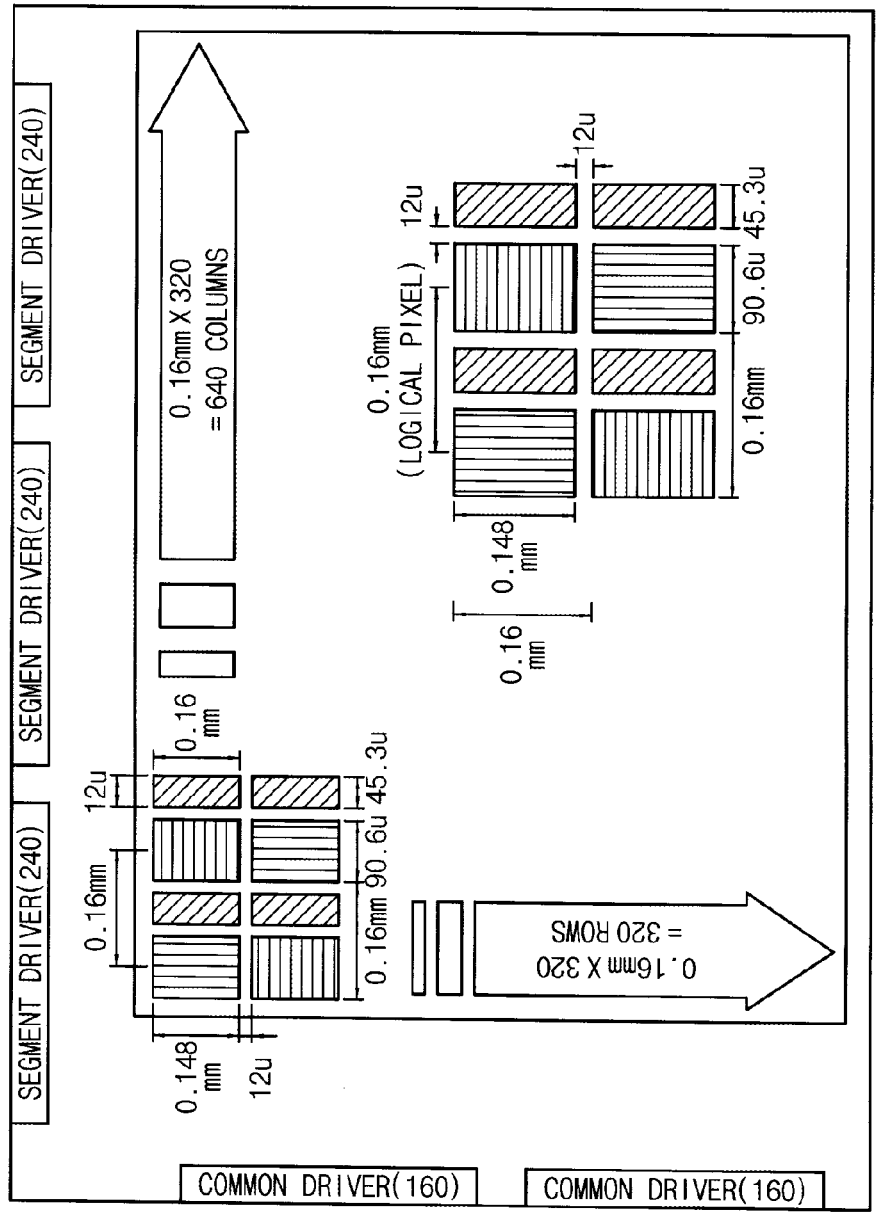
FIG. 24 is one particular embodiment of an implementation of a display made in accordance with several embodiments disclosed herein.

FIG. 24 shows one particular display embodiment for a 320×320 STN display using the subpixel repeat cell as disclosed herein. Although various subpixel dimensions are also disclosed in FIG. 24, it should be appreciated that other dimensions would suffice and that FIG. 24 is provided for illustrative purposes.

Various embodiments of the present disclosure may be implemented in or involve one or more computer systems. The computer system is not intended to suggest any limitation as to scope of use or functionality of described embodiments. The computer system includes at least one processing unit and memory. The processing unit executes computer-executable instructions and may be a real or a virtual processor. The computer system may include a multi-processing system which includes multiple processing units for executing computer-executable instructions to increase processing power. The memory may be volatile memory (e.g., registers, cache, random access memory (RAM)), non-volatile memory (e.g., read only memory (ROM), electrically erasable programmable read only memory (EEPROM), flash memory, etc.), or combination thereof. In an embodiment of the present disclosure, the memory may store software for implementing various embodiments of the present disclosure.

Further, the computer system may include components such as storage, one or more input computing devices, one or more output computing devices, and one or more communication connections. The storage may be removable or non-removable, and includes magnetic disks, magnetic tapes or cassettes, compact disc-read only memories (CD-ROMs), compact disc rewritables (CD-RWs), digital video discs (DVDs), or any other medium which may be used to store information and which may be accessed within the computer system. In various embodiments of the present disclosure, the storage may store instructions for the software implementing various embodiments of the present disclosure. The input computing device(s) may be a touch input computing device such as a keyboard, mouse, pen, trackball, touch screen, or game controller, a voice input computing device, a scanning computing device, a digital camera, or another computing device that provides input to the computer system. The output computing device(s) may be a display, printer, speaker, or another computing device that provides output from the computer system. The communication connection(s) enable communication over a communication medium to another computer system. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media includes wired or wireless techniques implemented with an electrical, optical, RF, infrared, acoustic, or other carrier. In addition, an interconnection mechanism such as a bus, controller, or network may interconnect the various components of the computer system. In various embodiments of the present disclosure, operating system software may provide an operating environment for software's executing in the computer system, and may coordinate activities of the components of the computer system.

Various embodiments of the inventive concept disclosed herein may be described in the general context of computer-readable media. Computer-readable media are any available media that may be accessed within a computer system. By way of example, and not limitation, within the computer system, computer-readable media include memory, storage, communication media, and combinations thereof.

Having described and illustrated the principles of the inventive concept with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

While the foregoing has been with reference to particular embodiments of the invention, it will be appreciated by those skilled in the art that changes in this embodiment may be made without departing from the principles and spirit of the invention.

What is claimed is:

1. A computer-implemented method of modifying image data, comprising:
   detecting, with a processor, a triggering pattern based on colors and saturation values of a group of pixels, wherein at least one of the pixels includes a plurality of subpixels, and wherein the triggering pattern includes at least a portion of one of a diagonal line and a vertical line;
   retrieving, from a memory, a pixel adjustment pattern defining how the image data is to be changed based on the triggering pattern and the colors that are detected; and
   shifting or suppressing, with a processor, the image data for a specific subpixel in the group of pixels according to the pixel adjustment pattern, wherein the specific subpixel is located in or adjacent to the diagonal line or the vertical line.

2. The method of claim 1, wherein detecting the triggering pattern comprises detecting a complementary color in the group of pixels.

3. The method of claim 2, wherein suppressing the image data for a specific subpixel comprises turning the specific subpixel's luminance value to zero.

4. The method of claim 2 further comprising applying energy that was assigned to the specific subpixel to a different subpixel.

5. The method of claim 2, wherein image data for displaying a yellow-saturated line is detected based on threshold value of a pixel that has a red subpixel, and wherein changing the image data for a specific subpixel comprises shifting energy from the red subpixel to a another red subpixel.

6. The method of claim 2, wherein image data for displaying a cyan-saturated line is detected based on a threshold value of a pixel that has a blue subpixel, and wherein changing the image data for a specific subpixel comprises shifting energy from the blue subpixel to another blue subpixel.

7. The method of claim 2, wherein image data for displaying a magenta-saturated line is detected based on a threshold value of a pixel that has a blue subpixel, and wherein changing the image data for a specific subpixel comprises shifting energy from the blue subpixel to another blue subpixel.

8. The method of claim 1, wherein the group of pixels is a 5×3 pixel area including three lines of five input pixels, the method further comprising sampling the group of pixels multiple times with 3×3 tests.

9. The method of claim 1 wherein the triggering pattern is a boundary between a saturated pixel and a non-saturated area of a vertical line.

10. The method of claim 9 wherein the detecting comprises counting threshold bits of four orthogonal neighboring pixels around a center pixel.

11. The method of claim 9, wherein changing the image data for the specific subpixel comprises unity-filtering the luminance value of a pixel having an R subpixel and a G subpixel to obtain a result, and dividing the result by two.

12. The method of claim 11, wherein the pixel is an RGB logical pixel.

13. The method of claim 9, wherein changing the image data for the specific subpixel comprises unity-filtering the luminance level of a pixel having a W subpixel and shifting half of the luminance level to another W subpixel.

14. The method of claim 13 further comprising dividing the luminance level of the W subpixel by M2, M2 being a ratio of brightness of W subpixels to brightness of RGB subpixels.

15. The method of claim 1 wherein the triggering pattern is a saturated pixel bordering a non-saturated area of a black diagonal line on a saturated-color background, and wherein the changing of the image data comprises turning off a subpixel.

16. The method of claim 14, wherein the changing of the image data further comprises dividing the energy of the specific subpixel into two, and applying each half of the energy to a white subpixel adjacent to the specific subpixel.

17. A computer-implemented method of modifying image data, comprising:
   detecting, with a processor, a border between saturated-color subpixels and non-saturated-color subpixels;
   retrieving, from a memory, a pixel adjustment pattern defining how the image data is to be changed based on the triggering pattern and the colors that are detected; and
   moving, with a processor, energy to white subpixels at the border according to the pixel adjustment pattern.

18. The method of claim 17, wherein the moving of energy to white subpixels comprises:
   taking energy from a selected one of the saturated-color subpixels; and
   adding at least part of the energy taken from the selected one of the saturated-color subpixels to a selected one of the white subpixels.

19. A display device comprising:
   a display panel having pixels that include subpixels of different colors;
   a memory storing pixel adjustment patterns that defines how image data for certain pixels is to be changed; and
   a processor that is coupled to the display panel and is configured to:
   receive image data;
   detect a triggering pattern based on colors and saturation values of a predetermined group of pixels;
   determine the presence of image data that would display at least one of a diagonal line or a vertical line;
   retrieve, from the memory, one of the pixel adjustment patterns according to the triggering pattern that is detected; and
   shift or suppress the image data for a specific subpixel in the group of pixels, wherein the specific subpixel is located in or adjacent to the diagonal line or the vertical line.

20. A display device comprising:

a display panel having pixels, the pixels including subpixels of different colors; and a processor that is configured to:

detect a border between saturated-color subpixels and non-saturated-color subpixels, and move energy to white subpixels at the border according to a pixel adjustment pattern retrieved from a memory.

21. A non-transitory computer-readable medium storing instructions for:

detecting, with a processor, a triggering pattern based on colors and saturation values of a group of pixels, wherein at least one of the pixels includes a plurality of subpixels, and wherein the triggering pattern includes at least a portion of one of a diagonal line and a vertical line;

retrieving, from a memory, a pixel adjustment pattern defining how the image data is to be changed based on the triggering pattern and the colors that are detected; and shifting or suppressing, with a processor, the image data for a specific subpixel in the group of pixels, wherein the specific subpixel is located in or adjacent to the diagonal line or the vertical line.

22. A non-transitory computer-readable medium storing instructions for:

detecting, with a processor, a border between saturated-color subpixels and un-saturated-color subpixels;

retrieving, from a memory, a pixel adjustment pattern defining how the image data is to be changed based on the triggering pattern and the colors that are detected; and moving, with a processor, energy to white subpixels at the border according to the pixel adjustment pattern.

* * * * *